(12) United States Patent
Lee et al.

(10) Patent No.: US 9,383,874 B2
(45) Date of Patent: Jul. 5, 2016

(54) TOUCH SCREEN PANEL, TOUCH SENSING CONTROLLER, AND TOUCH SENSING SYSTEM INCLUDING THE SAME

(71) Applicant: SAMSUNG ELECTRONICS CO., LTD., Suwon-si (KR)

(72) Inventors: Chang-ju Lee, Suwon-si (KR); Jong-oh Lee, Anyang-si (KR); Jin-bong Kim, Yongin-si (KR); Se-won Seo, Suwon-si (KR); Yoon-Kyung Choi, Seoul (KR); Steve J. Kim, Seongnam-si (KR); Young-joo Lee, Uijeongbu-si (KR); Heon Jekal, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 217 days.

(21) Appl. No.: 14/267,050

(22) Filed: May 1, 2014

(65) Prior Publication Data

US 2014/0327649 A1 Nov. 6, 2014

(30) Foreign Application Priority Data

May 2, 2013 (KR) .......................... 10-2013-0049619

(51) Int. Cl.
*G06F 3/044* (2006.01)

(52) U.S. Cl.
CPC ...... *G06F 3/044* (2013.01); *G06F 2203/04111* (2013.01)

(58) Field of Classification Search
CPC ....... G06F 3/044; G06F 3/041; G06F 3/0412; G06F 3/0416
USPC ................................. 345/174, 173
See application file for complete search history.

(56) References Cited

U.S. PATENT DOCUMENTS

| 6,198,516 B1 * | 3/2001 | Kim ...................... G02F 1/1368 349/139 |
| 6,424,553 B2 * | 7/2002 | Berggren ................. 365/230.01 |
| 2002/0180920 A1 * | 12/2002 | Noh ................... G02F 1/134363 349/141 |
| 2007/0008299 A1 | 1/2007 | Hristov |
| 2007/0279395 A1 | 12/2007 | Philipp et al. |
| 2009/0267916 A1 | 10/2009 | Hotelling |
| 2010/0090979 A1 | 4/2010 | Bae |

(Continued)

FOREIGN PATENT DOCUMENTS

| JP | 2009-9249 A | 1/2009 |
| KR | 10-2010-0099632 A | 9/2010 |
| KR | 10-1169250 B1 | 8/2012 |

*Primary Examiner* — Fred Tzeng
(74) *Attorney, Agent, or Firm* — Sughrue Mion, PLLC

(57) ABSTRACT

A touch screen panel is provided. The touch screen panel includes: a sensing area comprising a plurality of first electrodes arranged in a matrix form in first and second directions of a substrate and a plurality of second electrodes extending in the first direction, the plurality of second electrodes being arranged alternately with the plurality of first electrodes in the second direction; a channel wiring area including a plurality of channel wires configured to transmit signals of the plurality of first electrodes and signals of the plurality of second electrodes, the channel wiring area being disposed around the sensing area; and an electrode wiring area comprising a plurality of electrode wires connecting the plurality of first electrodes and the plurality of second electrodes to the plurality of channel wires, the electrode wiring area being in the sensing area, wherein at least two electrodes, from among the first electrodes, that are disposed in a same column are connected to different channel wires.

21 Claims, 20 Drawing Sheets

(56) References Cited

U.S. PATENT DOCUMENTS

| | | | |
|---|---|---|---|
| 2010/0163394 A1 | 7/2010 | Tang et al. | |
| 2010/0193258 A1 | 8/2010 | Simmons et al. | |
| 2010/0258360 A1 | 10/2010 | Yilmaz | |
| 2010/0321326 A1 | 12/2010 | Grunthaner et al. | |
| 2011/0102366 A1 | 5/2011 | Juan et al. | |
| 2012/0044203 A1* | 2/2012 | Ishizaki | G06F 3/0412 345/174 |
| 2012/0176323 A1* | 7/2012 | Cho | G06F 3/044 345/173 |
| 2012/0256642 A1 | 10/2012 | Badaye et al. | |
| 2013/0021296 A1 | 1/2013 | Min et al. | |
| 2013/0088459 A1* | 4/2013 | Yeh | G06F 3/044 345/174 |
| 2014/0111447 A1* | 4/2014 | Jeong | G06F 3/044 345/173 |
| 2014/0184522 A1* | 7/2014 | Ma | G06F 3/044 345/173 |
| 2014/0333571 A1* | 11/2014 | Hu | G06F 3/0412 345/174 |
| 2015/0029148 A1* | 1/2015 | Wang | G06F 3/0412 345/174 |
| 2015/0049042 A1* | 2/2015 | Fujii | G06F 3/0416 345/174 |
| 2015/0177873 A1* | 6/2015 | Kim | G06F 3/044 345/174 |

* cited by examiner

# TOUCH SCREEN PANEL, TOUCH SENSING CONTROLLER, AND TOUCH SENSING SYSTEM INCLUDING THE SAME

CROSS-REFERENCE TO RELATED APPLICATIONS

This application claims priority from Korean Patent Application No. 10-2013-0049619, filed on May 2, 2013, in the Korean Intellectual Property Office, the disclosure of which is incorporated herein in its entirety by reference.

BACKGROUND

The inventive concept relates to a touch screen panel, and more particularly, to a touch screen panel having improved sensing sensitivities, a touch sensing controller, and a touch sensing system including the touch screen panel and the touch sensing controller.

Touch screen panels are input devices through which an instruction displayed on a screen of a display apparatus is selected by a finger or a touch pen to input a user's command. Such touch screen panels may replace an input device that operates in a state in which the input device is connected to a display apparatus, like a keyboard and a mouse, and have been used in various display apparatuses due to user convenience that a user may rapidly and easily operate the touch screen panels through content that is displayed on a screen. In the case of a capacitive touch screen panel, capacitance values of a plurality of sensing units formed in the capacitive touch screen panel vary when a finger or a touch pen approaches or touches the capacitive touch screen panel, and thus, the occurrence of a touch and the position of the touch are sensed.

SUMMARY

The inventive concept provides a touch screen panel of which manufacturing method steps are reduced.

The inventive concept also provides a touch screen panel, a touch sensing controller, and a touch sensing system, which are capable of improving touch sensitivities by reducing the variation of touch data.

According to an aspect of the inventive concept, there is provided a touch screen panel including: a sensing area comprising a plurality of first electrodes arranged in a matrix form in first and second directions of a substrate and a plurality of second electrodes extending in the first direction, the plurality of second electrodes being arranged alternately with the plurality of first electrodes in the second direction; a channel wiring area including a plurality of channel wires configured to transmit signals of the plurality of first electrodes and signals of the plurality of second electrodes, the channel wiring area being disposed around the sensing area; and an electrode wiring area comprising a plurality of electrode wires connecting the plurality of first electrodes and the plurality of second electrodes to the plurality of channel wires, the electrode wiring area being in the sensing area, wherein at least two electrodes, from among the first electrodes, that are disposed in a same column are connected to different channel wires.

At least two electrodes, from among the first electrodes, that are disposed in different rows and different columns may be connected to a same channel wire.

At least two electrodes disposed in two adjacent rows, respectively, from among the first electrodes, that are disposed in the same column, may be connected to different channel wires.

The channel wiring area may include a first channel wiring area and a second channel wiring area that are disposed around two sides of the sensing area.

The plurality of first electrodes may be divided into a first group and a second group according to a position in the first direction, the first electrodes of the first group may be connected to channel wires in the first channel wiring area, and the first electrodes of the second group may be connected to channel wires in the second channel wiring area.

The plurality of first electrodes may be divided into at least two groups according to a position in the second direction, the first electrodes of an odd group from among the at least two groups may be connected to channel wires in the first channel wiring area, and the first electrodes of an even group from among the at least two groups may be connected to channel wires in the second channel wiring area.

The plurality of first electrodes may be divided into at least two groups according to a position in the second direction, and the first electrodes of different groups of the at least two groups may be connected to different channel wires.

The plurality of first electrodes and the plurality of second electrodes may be formed on a same surface of the substrate.

The channel wiring area may be formed on a circuit substrate that is different from the substrate and is attachable to the substrate.

A touch may be sensed by using capacitance variations of capacitors that are formed in the plurality of first electrodes and the plurality of second electrodes in the sensing area.

According to another aspect of the inventive concept, there is provided a touch sensing controller including: a plurality of terminals configured to receive a plurality of sensing signals which are provided from a touch screen panel through a plurality of channels; and a data mapping unit that is configured to generate touch data based on the plurality of sensing signals and determine a storage position of the touch data to store the touch data in a storage according to a position of an electrode among a plurality of electrodes arranged in a plurality of rows and columns in the touch screen panel.

The data mapping unit may determine the storage position in which the touch data is stored, based on a touch driving timing signal and channel wiring connection information.

The touch driving timing signal may indicate a position of the electrode in a direction of a row in the touch screen panel.

The data mapping unit may include: a touch data generator that amplifies the plurality of sensing signals and converts amplified sensing signals into digital signals to generate the touch data; and an address decoder that generates an addresses in which the touch data is stored, based on the touch driving timing signal and channel wiring connection information.

The data mapping unit may include: a touch data generator comprising a plurality of input terminals and a plurality of touch data generating units configured to generate the touch data based on the plurality of sensing signals that are received via the plurality of input terminals; a switching unit that connects the plurality of terminals to the plurality of input terminals of the touch data generator, respectively, and compensates for the position mismatch by switching connections between the plurality of terminals and the plurality of input terminals in response to a switching control signal; and a switching controller that is configured to generate the switching control signal based on a touch driving timing signal and channel wiring connection information.

The touch sensing controller may further include an address decoder that generates an address in which the touch data is stored, based on the touch driving timing signal.

The switching unit may include a plurality of switches that are turned on or off in response to the switching control signal.

The touch sensing controller may further include a look-up table including information indicating a connection relation between the plurality of electrodes of the touch screen panel and the plurality of channels.

The touch sensing controller may further include a touch data memory in which touch data corresponding to one frame is stored.

According to another aspect of the inventive concept, there is provided a touch sensing system including: the above touch screen panel and a touch sensing controller that obtains touch data from sensing signals received from the touch screen panel and determines a position at which the touch occurred, based on the touch data.

At least two electrodes from among the first electrodes that are disposed in a same column may be connected to different channel wires.

The plurality of first electrodes and the plurality of second electrodes may be formed on a same surface of the substrate.

The touch sensing controller may generate touch data based on the plurality of sensing signals and may determine a storage position of the touch data to store the touch data in a storage according to a position of a first electrode among the plurality of first electrodes of the touch screen panel.

The touch sensing system may further include a data memory in which touch data corresponding to at least one frame is stored.

According to another aspect of the inventive concept, there is provided a touch screen panel including: a plurality of electrodes, arranged in a plurality of rows and columns of a substrate, configured to sense touch on or above an electrode among the plurality of electrodes and generate a touch signal therefrom; a plurality of channel wires arranged in at least one side of the substrate; and a plurality of electrode wires connecting the plurality of electrodes to the plurality of channel wires, wherein a sum of lengths of electrode wires connected to one channel wire is substantially equal to a sum of lengths of electrode wires connected to another channel wire.

At least two electrodes, from among the plurality of electrodes, that are disposed in a same column may be connected to different channel wires. Alternatively, at least two electrodes, from among the plurality of electrodes, that are disposed in different rows and different columns may be connected to a same channel wire According to another aspect of the inventive concept, there is provided a touch screen panel including: a plurality of electrodes, arranged in a plurality of rows and columns of a substrate, configured to sense touch on or above an electrode among the plurality of electrodes and generate a touch signal therefrom; a plurality of channel wires arranged in at least one side of the substrate; and a plurality of electrode wires connecting the plurality of electrodes to the plurality of channel wires, wherein a sum of lengths of electrode wires connected to all electrodes in one column is substantially equal to a sum of lengths of electrode wires connected to all electrodes in any of the other columns among the plurality of columns.

At least two electrodes, from among the plurality of electrodes, that are disposed in a same column may be connected to different channel wires.

The plurality of channel wires may include channel wires disposed in a first wiring area on one side of the substrate and channel wires disposed in a second wiring area on another side of the substrate, and the at least two electrodes disposed in the same column may be connected to channel wires disposed in the first and second wiring areas, respectively.

The at least two electrodes may be disposed in two adjacent rows.

BRIEF DESCRIPTION OF THE DRAWINGS

Exemplary embodiments of the inventive concept will be more clearly understood from the following detailed description taken in conjunction with the accompanying drawings, in which.

DETAILED DESCRIPTION OF THE EXEMPLARY EMBODIMENTS

Figure 1:
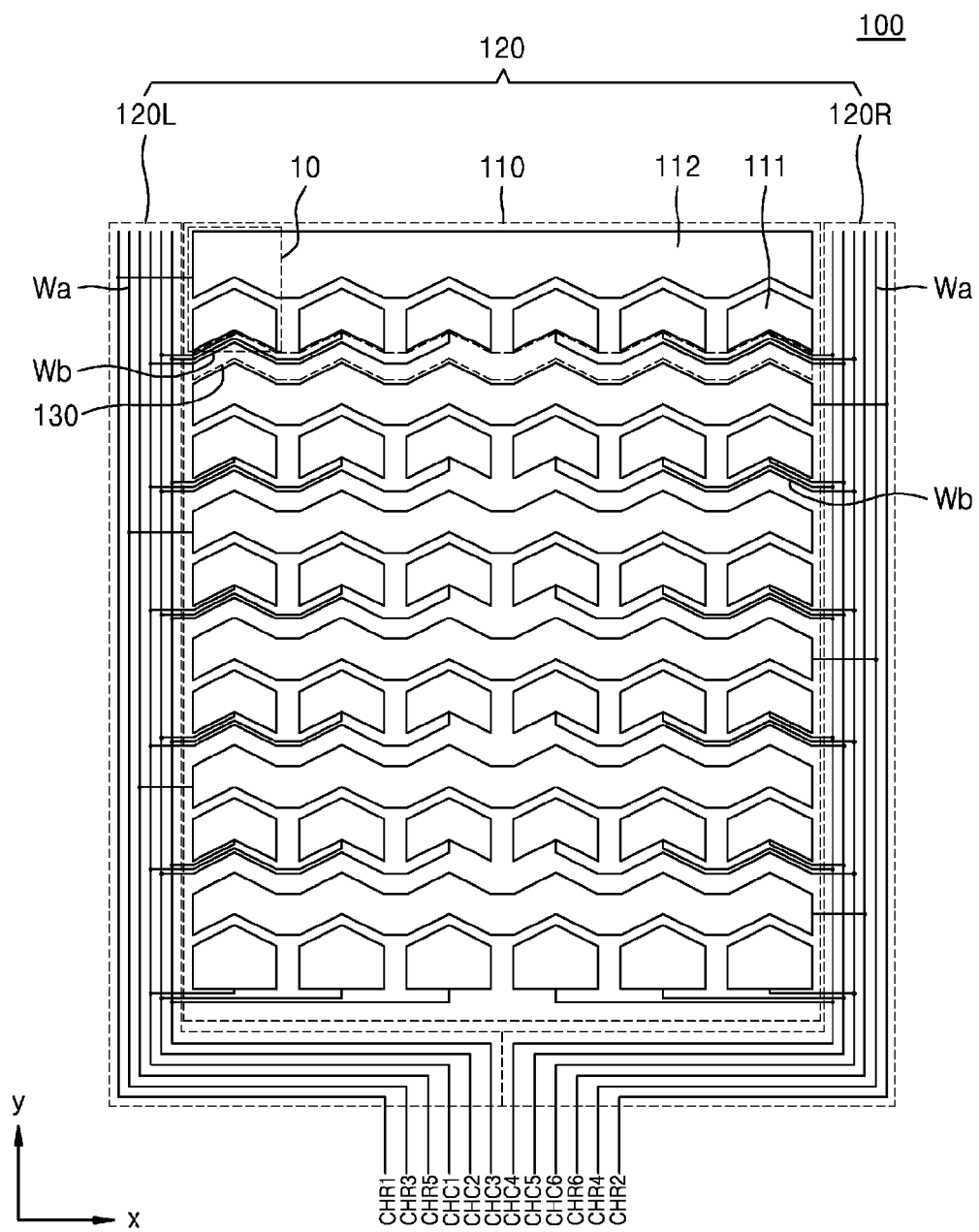
FIG. 1 is a diagram illustrating a touch screen panel according to an exemplary embodiment of the inventive concept.

The inventive concept will now be described more fully with reference to the accompanying drawings, in which exemplary embodiments of the inventive concept are shown. The inventive concept may, however, be embodied in many different forms and should not be construed as being limited to the embodiments set forth herein; rather, these embodiments are provided so that this disclosure will be thorough and complete, and will fully convey the inventive concept to those of ordinary skill in the art. Thus, the inventive concept may include all revisions, equivalents, or substitutions which are included in the concept and the technical scope related to the inventive concept. Like reference numerals in the drawings denote like elements. In the drawings, the thicknesses of layers and regions are exaggerated for clarity.

Furthermore, all examples and conditional language recited herein are to be construed as being without limitation to such specifically recited examples and conditions. Throughout the specification, a singular form may include plural forms, unless there is a particular description contrary thereto. Also, terms such as "comprise" or "comprising" are used to specify existence of a recited form, a number, a process, an operation, a component, and/or groups thereof, not excluding the existence of one or more other recited forms, one or more other numbers, one or more other processes, one or more other operations, one or more other components and/or groups thereof.

Unless expressly described otherwise, all terms including descriptive or technical terms which are used herein should be construed as having meanings that are obvious to one of ordinary skill in the art. Also, terms that are defined in a general dictionary and that are used in the following description should be construed as having meanings that are equivalent to meanings used in the related description, and unless expressly described otherwise herein, the terms should not be construed as being ideal or excessively formal.

Expressions such as "at least one of," when preceding a list of elements, modify the entire list of elements and do not modify the individual elements of the list.

FIG. 1 is a diagram illustrating a touch screen panel 100 according to an exemplary embodiment of the inventive concept. For convenience of explanation, patterns and electrical connections of electrodes of the touch screen panel 100 are schematically illustrated.

Referring to FIG. 1, the touch screen panel 100 may include a sensing area 110 in which a touch occurs, and a channel wiring area 120 that is around the sensing area 110.

The sensing area 110 is a two-dimensional plane in which a touch occurs, and a plurality of first electrodes 111 and a plurality of second electrodes 112, which determine a position of the touch, are patterned in the sensing area 110. A touch means not only an object's direct touch on the touch screen panel 100 but also a proximity touch sensed by the sensing area 110 when an object approaches the touch screen panel 100 to a predetermined distance from the sensing area 110.

The plurality of first electrodes 111 that determine a position of a touch in a first direction (e.g., the x-axis direction), and the plurality of second electrodes 112 that determine a position of the touch in a second direction (e.g., the y-axis direction) may be arranged in the sensing area 110. For convenience of explanation, hereinafter, the first direction is referred to as 'the x-axis direction', and the second direction is referred to as 'the y-axis direction'. An electrode wiring area 130, in which a plurality of electrode wires Wb connected to the plurality of first electrodes 111, respectively, are formed, may be in a portion of the sensing area 110. The electrode wiring area 130 may be between the first electrodes 111 and the second electrodes 112 or under the first electrodes 111.

The sensing area 110 may be an area of a substrate, e.g., a transparent substrate, and the plurality of first electrodes 111 and the plurality of second electrodes 112 may be formed of a transparent material, such as indium tin oxide (ITO), on the same surface of the substrate. The plurality of electrode wires Wb may also be formed of a transparent material, and may be formed of the same material as the first and second electrodes 111 and 112 or a material that is different from those of the first and second electrodes 111 and 112. The transparent electrode may be formed of any of various conductive materials, e.g., ITO, zinc oxide (ZnO), metal mesh, graphene, poly(3,4-ethylenedioxythiophene) (PEDOT) such as PEDOT/polystyrene sulfonate (PSS), carbon nanotubes (CNT), and silver (Ag) nanowires.

The plurality of first electrodes 111 may be arranged in a matrix in the x-axis direction and the y-axis direction of the substrate, and the plurality of second electrodes 112 may extend in the x-axis direction and may be arranged alternately with the plurality of first electrodes 111 in the y-axis direction. As illustrated in FIG. 1, the plurality of second electrodes 112 each are long in the x-direction, the plurality of first electrodes 111 each are short, compared to the plurality of second electrodes 112, and the plurality of second electrodes 112 and the plurality of first electrodes 111 may be arranged alternately with each other in the y-axis direction.

A first electrode 111 and a portion of a second electrode 112 that is adjacent to the first electrode 111 may constitute a sensing node 10. In the case of a touch screen panel using a mutual capacitive method, a predetermined voltage pulse is applied to a driving electrode and a sensing electrode collects charges corresponding to the predetermined voltage pulse. In this case, an electric field is changed when a conductor, such as a person's finger or a touch pen, is placed between the driving electrode and the sensing electrode, and thus, a touch is sensed through a change in capacitance between the driving electrode and the sensing electrode. In the current embodiment, the second electrodes 112 may be driving electrodes, and the first electrodes 111 may be sensing electrodes. On the contrary, the first electrodes 111 may be driving electrodes, and the second electrodes 112 may be sensing electrodes. Thus, a first electrode 111 and a portion of a second electrode 112 that is adjacent to the first electrode 111 may constitute the sensing node 10 that is a point sensing a touch. Since each of the plurality of first electrodes 111 arranged on the sensing area 110 in a matrix constitutes a sensing node 10 together with a portion of an adjacent second electrode 112, a plurality of sensing nodes 10 may be arranged on the sensing area 110 in a matrix. When a touch occurs in the sensing area 110, the capacitance of a sensing node 10 at a point where the touch occurs is changed, and thus, the occurrence of the touch and the position thereof may be determined.

In FIG. 1, as an example, the touch screen panel 100 includes 6 second electrodes 112 arranged in six rows and 36 first electrodes 111 arranged in six rows and six columns, and thus, 36 sensing nodes are disposed in six rows and six columns on the sensing area 110. However, the inventive concept is not limited thereto. The number of first electrodes 111, the number of second electrodes 112, and the alignment of the first and second electrodes 111 and 112 may be changed according to the size of the sensing area 110 and according to how accurately a touch position is determined.

Still referring to FIG. 1, the channel wiring area 120 may be around the sensing area 110 and may include the plurality of channel wires Wa. The plurality of channel wires Wa each may be a transparent electrode formed of a material, such as ITO, metal mesh, graphene, or the like, or as an Ag thin film formed by a screen printing method. The plurality of channel wires Wa may be formed of any one of other various conductive materials by using any one of various methods. In the current embodiment, the channel wiring area 120 is around the left, right, and lower sides of the sensing area 110. However, the inventive concept is not limited thereto, and the channel wiring area 120 may be around some or all of the sides of the sensing area 110.

The plurality of channel wires Wa are electrically connected to the first electrodes 111 and the second electrodes 112, and may transmit signals that are applied to the first and second electrodes 111 and 112 from the outside, and also transmit signals that are generated from the first and second electrodes 111 and 112 to the outside. The plurality of channel wires Wa may be electrically connected to the first and second electrodes 111 and 112 through the plurality of electrode wires Wb.

An external device (not shown) of the touch screen panel 100, such as a touch sensing controller, may be electrically connected to the first and second electrodes 111 and 112 on the touch screen panel 100, may transmit or receive signals through a plurality of channels CHR1 to CHR6 and CHC1 to CHC6, and may obtain touch data of each sensing node 10, e.g., numerical data indicating the change in capacitance of each sensing node 10. Based on the obtained touch data, the external device (not shown) of the touch screen panel 100 may determine whether a touch occurred in the touch screen panel 100 and may determine the position of the touch. In this case, the plurality of channel wires Wa transmit signals between the first and second electrodes 111 and 112 and the plurality of channels CHR1 to CHR6 and CHC1 to CHC6. The signals that are transmitted through the plurality of channel wires Wa may be, for example, voltage signals or current signals, and may be signals modulated in time or frequency. The number of channel wires Wa may be equal to the number of channels CHR1 to CHR6 and CHC1 to CHC6, and for example, the plurality of channel wires Wa may be arranged parallel to each other at equal intervals.

As illustrated in FIG. 1, the second electrodes 112 may be connected to different channel wires Wa in the channel wiring area 120, and first electrodes 111 arranged on the same position on the y-axis, i.e., in the same row, from among the first electrodes 111 may also be connected to different channel wires Wa in the channel wiring area 120. First electrodes 111 arranged in different positions on the y-axis and the x-axis, i.e., in different rows and different columns, from among the first electrodes 111 may be connected to the same channel wire Wa in the channel wiring area 120. The first electrodes 111 determine a position of a touch on the x-axis. Thus, the first electrodes 111 arranged on the same position on the y-axis are electrically separated from one another, but the first electrodes 111 arranged in different positions on the y-axis are allowed to be electrically connected to each other. Thus, the number of channel wires Wa may be reduced by connecting the first electrodes 111 arranged in different positions on the y-axis to the same channel wire Wa. In this case, in the touch screen panel 100 according to the embodiment of the inventive concept, as illustrated in FIG. 1, first electrodes 111 arranged in different positions on the x-axis and the y-axis, i.e., first electrodes 111 arranged in different rows and different columns, may be connected to the same channel wire Wa in the channel wiring area 120.

However, if like the touch screen panel 100 according to the present embodiment of the inventive concept, the first electrodes 111 determining a position of a touch on the x-axis and the second electrodes 112 determining a position of the touch on the y-axis are formed on the same side of the same substrate and the first electrodes 111 are electrically connected to each other through the electrode wires Wb and the channel wires Wa in the channel wiring area 120 that is around the sensing area 110, a difference in a parasitic element, e.g., parasitic capacitance or parasitic resistance, due to a difference in lengths and thicknesses of the channel and electrode wires Wa and Wb may have an influence on touch sensing characteristics of the touch screen panel 100. To prevent the degradation of the touch sensing characteristics due to the parasitic elements of the channel and electrode wires Wa and Wb, first electrodes 111 arranged in various positions on the x-axis may be connected to a same channel wire Wa by connecting at least two first electrodes 111 arranged in different positions on the x-axis and the y-axis to the same channel wire Wa. Such a wiring structure is described in detail below with reference to FIG. 2.

Figure 2:
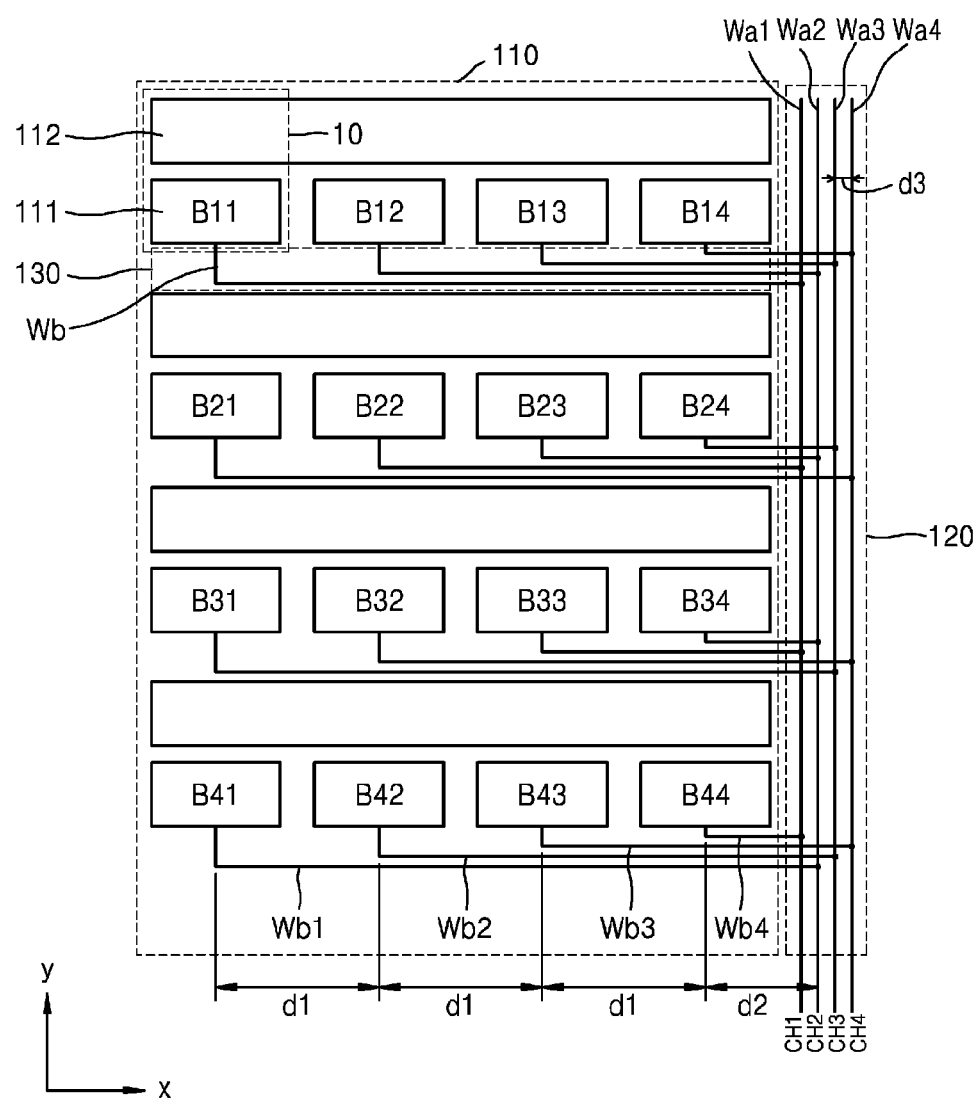
FIG. 2 is a diagram illustrating a wiring structure of the touch screen panel of FIG. 1 in detail, according to an exemplary embodiment.

FIG. 2 is a diagram minutely illustrating a wiring structure of the touch screen panel 100 of FIG. 1, according to an exemplary embodiment. For convenience of explanation, sixteen first electrodes 111 are arranged in four rows and four columns, four second electrodes 112 are arranged in four rows, and a wiring relation of the first electrodes 111 is illustrated.

Referring to FIG. 2, first electrodes B11 to B14 arranged in a first row may be connected to first to fourth channel wires Wa1 to Wa4, respectively. Among first electrodes B21 to B24 arranged in a second row, the first electrode B21 of a first column may be connected to the fourth channel wire Wa4, the first electrode B22 of a second column may be connected to the first channel wire Wa1, the first electrode B23 of a third column may be connected to the second channel wire Wa2, and the first electrode B24 of a fourth column may be connected to a third channel wire Wa3. Among first electrodes B31 to B34 arranged in a third row, the first electrode B31 of the first column may be connected to the third channel wire Wa3, the first electrode B32 of the second column may be connected to the fourth channel wire Wa4, the first electrode B33 of the third column may be connected to the first channel wire Wa1, and the first electrode B34 of the fourth column may be connected to the second channel wire Wa2. Among first electrodes B41 to B44 arranged in a fourth row, the first electrode B41 of the first column may be connected to the second channel wire Wa2, the first electrode B42 of the second column may be connected to the third channel wire Wa3, the first electrode B43 of the third column may be connected to the fourth channel wire Wa4, and the first electrode B44 of the fourth column may be connected to the first channel wire Wa1. In this manner, the connection between the first electrodes B11 to B14 and the first to fourth channel wires Wa1 to Wa4, the connection between the first electrodes B21 to B24 and the first to fourth channel wires Wa1 to Wa4, the connection between the first electrodes B31 to B34 and the first to fourth channel wires Wa1 to Wa4, and the connection between the first electrodes B41 to B44 and the first to fourth channel wires Wa1 to Wa4 may be different from each other. Accordingly, first electrodes 111 disposed on different positions on the x-axis and the y-axis may be connected to the same channel wire, and first electrodes 111 disposed on the same position on the x-axis may be connected to different channel wires.

The lengths of first to fourth electrode wires Wb1 to Wb4 that connect the first electrodes 111 to the first to fourth channel wires Wa1 to Wa4, respectively, are different from one another. A distance d1 between the first electrodes 111 arranged in the first to fourth columns and a distance d2 between the first electrodes B14, B24, B34, and B44 arranged in the fourth column and the first channel wire Wa1 may be about several millimeters or less, and a distance d3 between the first to fourth channel wires Wa1 to Wa4 may be about several hundred micrometers. Thus, the lengths of the first to fourth electrode wires Wb1 to Wb4 may be different depending on positions of the first electrodes 111 on the x-axis, which are connected thereto. In this case, since the lengths of the first to fourth electrode wires Wb1 to Wb4 are different from one another, parasitic capacitances Cwb1 to Cwb4 of the first to fourth electrode wires Wb1 to Wb4 are also different from one another. The parasitic capacitances Cwb1 to Cwb4 of the first to fourth electrode wires Wb1 to Wb4 may be roughly represented as Equations 1 to 4.

$$CWb1 = Cd1*3 + Cd2 \quad (1)$$

$$CWb2 = Cd1*2 + Cd2 \quad (2)$$

$$CWb3 = Cd1*1 + Cd2 \quad (3)$$

$$CWb4 = Cd2 \quad (4)$$

Cd1 is a capacitance depending on the distance d1 between the first electrodes 111 arranged in the first to fourth columns, and Cd2 is a capacitance depending on the distance d2 between the first electrodes B14, B24, B34, and B44 arranged in the fourth column and the first channel wire Wa1.

If like conventional ways, the first electrodes 111 disposed on the same position on the x-axis are connected to the same channel wire and the first electrodes Bn1 to Bn4 of each row (where n is 1 to 4) are connected to the first to fourth channel wires Wa1 to Wa4, respectively, parasitic capacitances C_CH1 to C_CH4 of channels CH1 to CH4 to which the first to fourth channel wires Wa1 to Wa4 are respectively connected may be represented as Equations 5 to 8.

$$C\_CH1 = Cwa + 4*Cwb1 = Cwa + 4*(3*Cd1 + Cd2) \quad (5)$$

$$C\_CH2 = Cwa + 4*Cwb2 = Cwa + 4*(2*Cd1 + Cd2) \quad (6)$$

$$C\_CH3 = Cwa + 4*Cwb3 = Cwa + 4*(1*Cd1 + Cd2) \quad (7)$$

$$C\_CH4 = Cwa + 4*Cwb4 = Cwa + 4*(0*Cd1 + Cd2) \quad (8),$$

where Cwa is a parasitic capacitance of each of the channel wires Wa1 to Wa4.

Thus, a difference in parasitic capacitance between the channels CH1 to CH4 may be relatively large. However, since in the wiring structure according to the present embodiment of the inventive concept, the first to fourth electrode wires Wb1 to Wb4 are connected individually to the first to fourth channel wires Wa1 to Wa4, the parasitic capacitances C_CH1 to C_CH4 of the channels CH1 to CH4 may be calculated by using Equation 9 and may be equal to or similar to one another.

$$C\_CHn = Cwa + Cwb1 + Cwb2 + Cwb3 + Cwb4 \text{ (where } n \text{ is 1 to 4)} \quad (9)$$

Thus, in the touch screen panel 100 according to the present embodiment of the inventive concept, touch sensitivities may be improved since a difference in parasitic capacitance between channels is relatively small. Although in FIG. 2, the first electrodes 111 are arranged in four rows and four columns and are connected to the four channel wires Wa1 to Wa4, the inventive concept is not limited thereto. Also in the case where the first electrodes 111 are arranged in m rows and n columns (where m and n are natural numbers and n is greater than m) and the number of channel wires Wa is n, the lengths of the electrode wires Wb that are connected to respective channels may be configured to be similar to one another by appropriately adjusting connections between the first electrodes 111 and the channel wires Wa, as described above. Accordingly, the uniformity of touch data may be increased by making the difference of parasitic capacitances between channels CH1 to CHn not large.

In addition, although the first to fourth channel wires Wa1 to Wa4 are indicated to have the same width in FIGS. 1 and 2, the widths of actual channel wires formed by using a manufacturing method may be different from one another. Accordingly, a difference in parasitic capacitance and parasitic resistance between the first to fourth channel wires Wa1 to Wa4 may occur. In this case, when first electrodes 111 of the same position on the x-axis are connected to one channel wire, a difference in parasitic elements of the first to fourth channel wires Wa1 to Wa4 may be reflected in touch data, and thus, a position of a touch on the x-axis may be determined wrong. However, in the case where like the present embodiment of the inventive concept, first electrodes 111 of different positions on the x-axis are connected to one channel wire, although a difference in parasitic elements of the first to fourth channel wires Wa1 to Wa4 are reflected in touch data of each row, the difference in parasitic elements of the first to fourth channel wires Wa1 to Wa4 may be cancelled out when weighted averaging touch data corresponding to the same position on the x-axis to determine a position of a touch on the x-axis.

Still referring to FIG. 1, the channel wiring area 120 may be divided into a first channel wiring area 120R that is around the right side of the sensing area 110, and a second channel wiring area 120L that is around the left side of the sensing area 110. The first electrodes 111 may be divided into two groups that are disposed on the left and the right based on the center on the x-axis, first electrodes 111 included in the right group may be connected to the channel wires Wa in the first channel wiring area 120R, and first electrodes 111 included in the left group may be connected to the channel wires Wa in the second channel wiring area 120L. In general, when the channel wires Wa are formed around only one side of the sensing area 110, one side of the sensing area 110 may be wider than the other side of the sensing area 110. However, since in the touch screen panel 100 of FIG. 1, the channel wires Wa are formed around both the left side and the right side of the sensing area 110, it is possible to prevent one side of the sensing area 110 from being wider than the other side of the sensing area 110. However, the inventive concept is not limited thereto, and if a difference between widths of sides of the touch screen panel 100 is within a permissible range although the channel wires Wa are formed around only one side of the sensing area 110, the channel wiring area 120 may be in only one side of the sensing area 110.

The channel wiring area 120 may be formed in the same substrate, like the sensing area 110. Alternatively, the channel wiring area 120 may be formed in a substrate that is different from that in which the sensing area 110 is formed. When the channel wiring area 120 is formed in a substrate that is different from that in which the sensing area 110 is formed, the substrate in which the channel wiring area 120 is formed may be attached to the substrate in which the sensing area 110 is formed. For example, the sensing area 110 may be formed in a transparent substrate, the channel wiring area 120 may be formed in a circuit substrate, such as a flexible printed circuit board (FPCB), and the circuit substrate may be attached to the transparent substrate.

As described above, in the touch screen panel 100 according to the present embodiment of the inventive concept, the first electrodes 111 determining a position on the x-axis and the second electrodes 112 determining a position on the y-axis may be formed in the same side of the same substrate, and thus, a manufacturing time and cost of the touch screen panel 100 may be reduced. In addition, first electrodes 111 arranged on the same position on the x-axis, i.e., first electrodes 111 arranged on the same column, may be connected to different channel wires Wa separately, and thus, a difference in parasitic capacitance due to the electrode wires Wb is relatively small between the channels CHC1 to CHC6 to which the first electrodes 111 are connected. Thus, the effect due to a difference between the widths of the channel wires Wa is relatively small, thereby improving sensing sensitivities. Accordingly, touch sensing characteristics of the touch screen panel 100 may be improved.

Figure 3A:
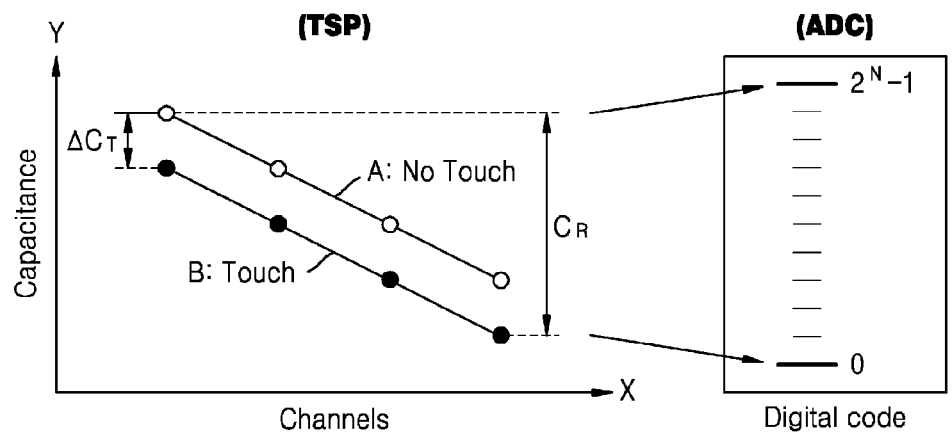
FIGS. 3A and 3B are graphs for explaining the relation between capacitance of a touch screen panel and a signal code, according to an exemplary embodiment.
Figure 3B:
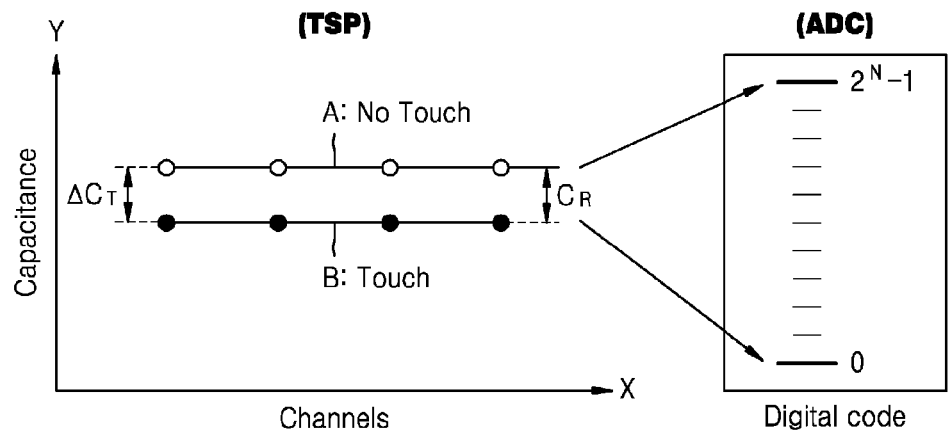

FIGS. 3A and 3B are graphs for explaining the relation between a sensing value of mutual capacitance of a touch screen panel and a digital code of a signal, according to an exemplary embodiment. FIG. 3A illustrates a case in which the difference of parasitic capacitance between channels of the touch screen panel is relatively large, and FIG. 3B illustrates a case in which the difference of parasitic capacitance between the channels is relatively small depending on the wiring structure as shown in the touch screen panel 100 of FIG. 1.

The graphs of FIGS. 3A and 3B each illustrate a sensing value of mutual capacitance for each channel of the touch screen panel. Parasitic elements, such as parasitic capacitance and parasitic resistance, are reflected in the sensing value of the mutual capacitance. Thus, although mutual capacitance formed by the first electrode 111 of FIG. 1 and the second electrode 112 of FIG. 1 is the same between the channels, the sensing value of the mutual capacitance for each channel may be changed due to parasitic elements occurring due to the channel wires Wa and electrode wires Wb. Thus, although the mutual capacitance is the same between the channels, the sensing value of the mutual capacitance for each channel may be changed due to the difference of parasitic capacitance between the channels. Line "A" indicates a sensing value of mutual capacitance for each channel when a touch does not occur on the touch screen panel, and line "B" indicates a sensing value of mutual capacitance for each channel when a touch occurs on the touch screen panel. The mutual capacitance may be reduced depending on the occurrence of a touch, and as illustrated in FIGS. 3A and 3B, the sensing value B of the mutual capacitance when a touch occurs may be smaller than the sensing value A of the mutual capacitance when a touch does not occur.

Mutual capacitance that is sensed in each of the channels of the touch screen panel may be applied to a touch sensing circuit as a current or voltage signal, and an analog-to-digital converter (ADC) of the touch sensing circuit may convert the current or voltage signal into a digital code. In this case, a digital code value SC of the digital code may be represented as Equation 10.

$$SC = 2^N / C_R * \Delta C_T \quad (10)$$

"N" is the number of total bits of the digital code, "$C_R$" is a total change amount of mutual capacitance that is sensed by the touch screen panel, and "$\Delta C_T$" is a reduction amount of the mutual capacitance that occurs depending on a touch.

Referring to Equation 10, in the case where "$\Delta C_T$" is constant, the digital code value SC increases when "$C_R$" decreases. When the digital code value SC is increased, a change in the mutual capacitance may be more accurately sensed, thereby increasing sensing sensitivities.

In FIG. 3A, the difference of parasitic capacitance between the channels is relatively large, and thus, the total change amount "$C_R$" of mutual capacitance that is sensed by the touch screen panel is relatively large. On the contrary, in FIG. 3B, the difference of parasitic capacitance between the channels is relatively small, and thus, the total change amount "$C_R$" of mutual capacitance that is sensed by the touch screen panel is relatively small. Thus, when the difference of parasitic capacitance between the channels is relatively small, the digital code value SC increases, and thus, sensing sensitivities are increased. In this manner, according to the wiring structure of the touch screen panel 100 of FIG. 1, the difference of parasitic capacitance between the channels may be reduced, and thus, sensing sensitivities may be increased.

Figure 4:
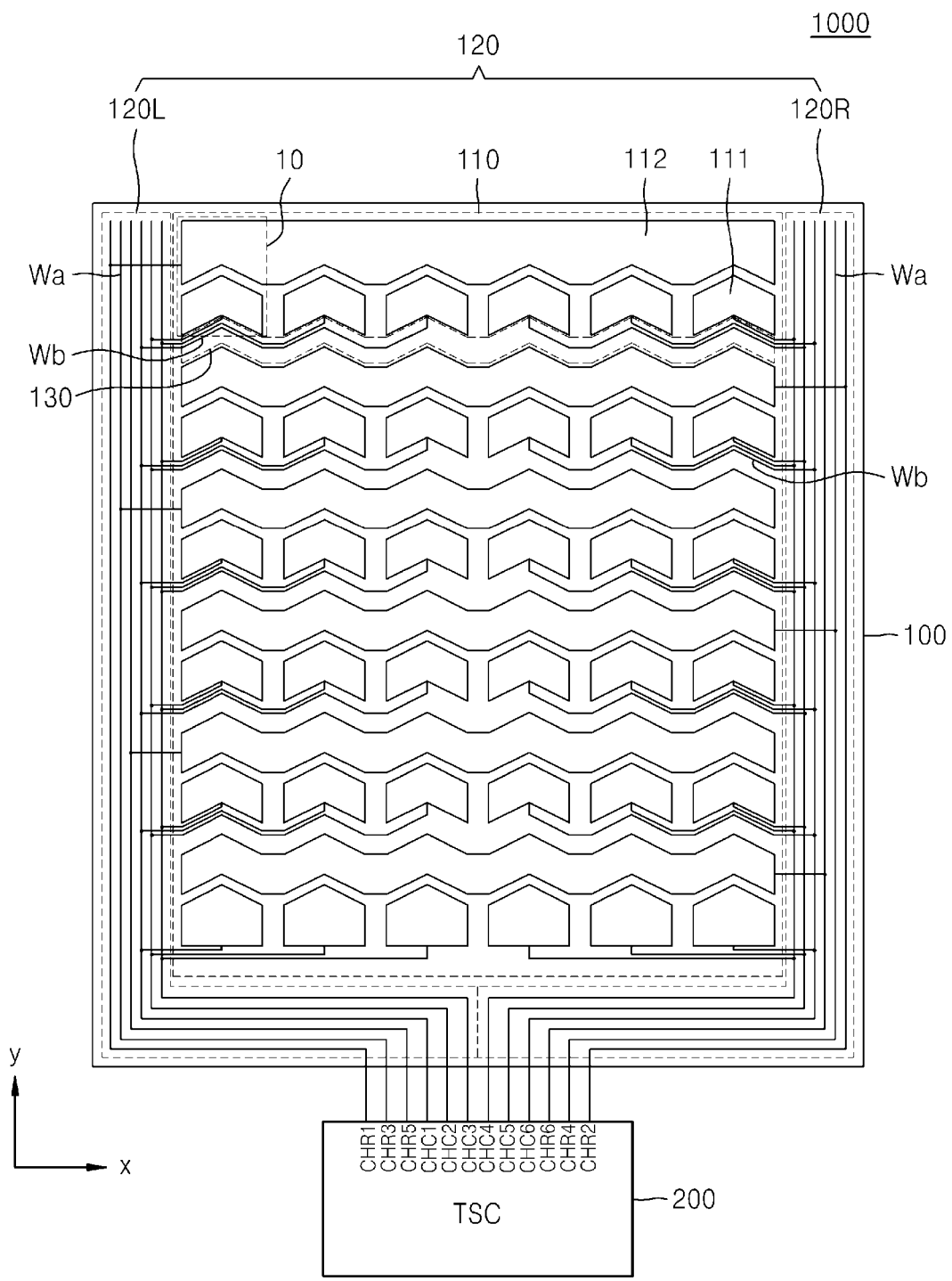
FIG. 4 is a block diagram of a touch sensing system according to an exemplary embodiment of the inventive concept.

FIG. 4 is a block diagram of a touch sensing system 1000 according to an exemplary embodiment of the inventive concept.

Referring to FIG. 4, the touch sensing system 1000 may include a touch screen panel such as the touch screen panel 100 of FIG. 1 and a touch sensing controller 200.

As described with reference to FIG. 1, a plurality of first electrodes 111 determining a position of a touch on the x-axis and a plurality of second electrodes 112 determining a position of the touch on the y-axis may be formed on the same side of the same substrate. First electrodes 111 disposed on the same position on the x-axis may be connected to different channel wires Wa, and at least two of first electrodes 111 disposed on different positions on the x-axis and the y-axis may be connected to the same channel wire Wa. Since the touch screen panel 100 has been described above in detail with reference to FIG. 1, a repeated description is omitted.

The touch sensing controller 200 may transmit or receive signals to or from the touch screen panel 100 through channels, and may determine whether a touch occurs on the touch screen panel 100 and may determine the position of the touch. The touch sensing controller 200 may obtain touch data depending on a change in the capacitance of a sensing node 10. Based on the touch data, the touch sensing controller 200 may determine whether a touch occurs on the touch screen panel 100 and may also determine the position of the touch.

When the touch data is stored in a storage (not shown), the touch sensing controller 200 may determine a position in which the touch data is stored in the storage, in consideration of a wiring structure of the touch screen panel 100, i.e., a connection relation between channel wires Wa and the first electrodes 111. Alternatively, when the touch sensing controller 200 reads the touch data stored in the storage and calculates touch coordinates, the touch sensing controller 200 may rearrange read touch data in consideration of the wiring structure of the touch screen panel 100.

By using the wiring structure of the touch screen panel 100, sensing signals generated in first electrodes 111 of the same position on the x-axis of the touch screen panel 100, i.e., the same column of the touch screen panel 100, are received through different channels CHC1 to CHC6, respectively. When touch data is stored in the storage according to the order of channels CHC1 to CHC6 through which corresponding sensing signals are received, touch data corresponding to first electrodes 111 of the same column on the touch screen panel 100 is disposed in different rows in the storage. Then, if the touch data is read according to the order of a position in the storage, and then the read touch data is used for calculating touch coordinates, wrong touch coordinates may be calculated. Thus, in order to calculate correct touch coordinates, the touch sensing controller 200 may determine the position, in which the touch data is stored, in consideration of a connection relation between the first electrodes 111 of the touch screen panel 100 and the channel wires Wa of the touch screen panel 100 or may rearrange the touch data when the touch data is read to calculate touch coordinates after the touch data is stored.

Figure 5:
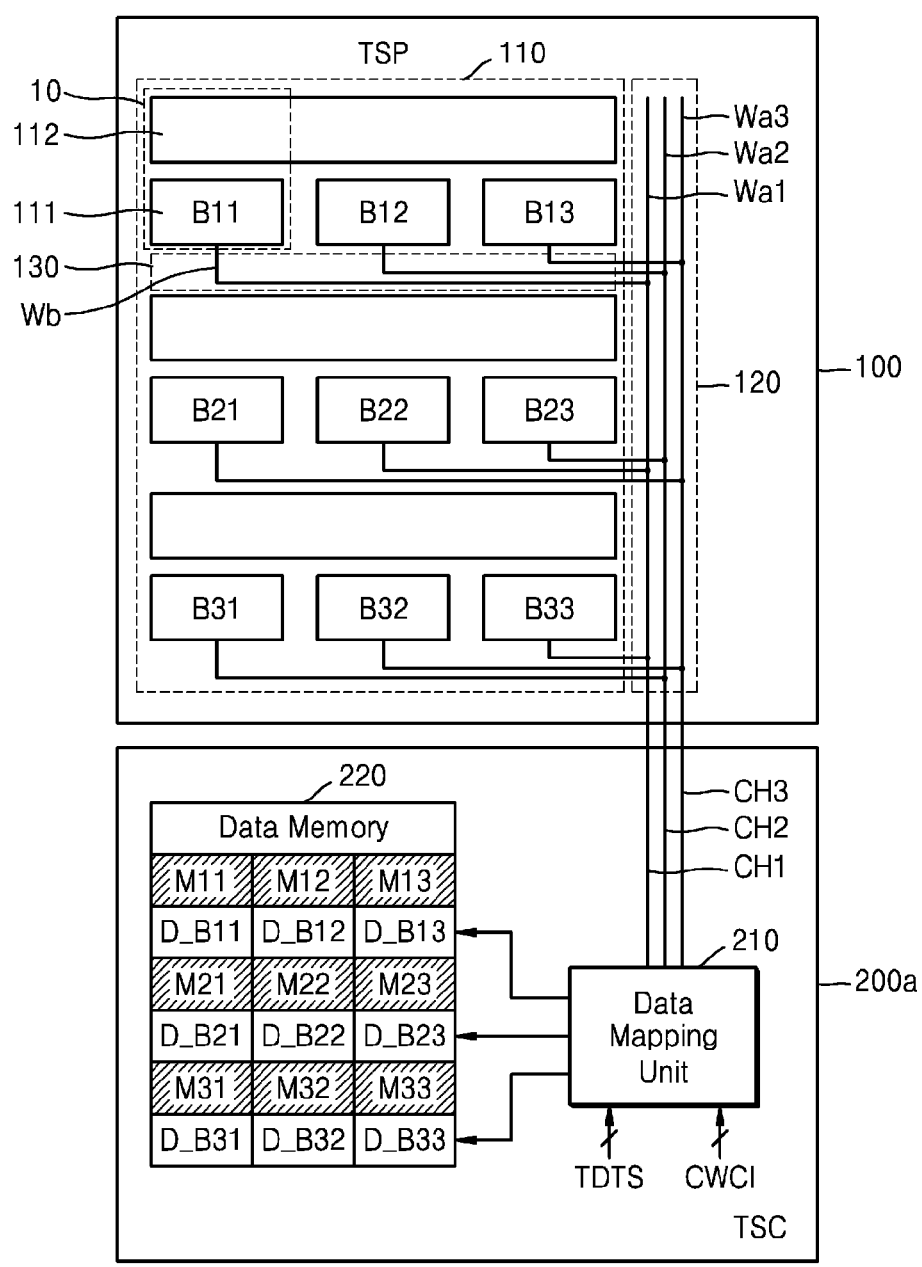
FIG. 5 is a block diagram illustrating an example of the touch sensing controller of FIG. 4.

FIG. 5 is a block diagram illustrating an example of the touch sensing controller 200 of FIG. 4. In FIG. 5, for convenience of explanation, a touch screen panel 100, in which the electrode arrangement and wiring thereof are simplified, is illustrated together with a touch sensing controller 200a, and signals that are sensed by a plurality of first electrodes 111 are provided to the touch sensing controller 200a through three channels CH1, CH2, and CH3. Referring to FIG. 5, in the touch screen panel 100, first electrodes B11 to B13, B21 to B23, and B31 to B33 of each row are connected to corresponding electrode wires Wb on an electrode wiring area 130, and are connected to first to third channel wires Wa1 to Wa3 in a channel wiring area 120 through the corresponding electrode wires Wb. Thus, sensing signals sensed by the first electrodes B11 to B13, B21 to B23, and B31 to B33 of each row may be provided to the touch sensing controller 200a through the first to third channels CH1 to CH3. The sensing signals provided to the touch sensing controller 200a may be converted into digital signals D_B11 to D_B33, and the digital signals D_B11 to D_B33 may be stored in a storage, such as a data memory 220.

In this case, depending on a wiring structure of the touch screen panel 100, sensing signals sensed by the first electrodes B11 to B31, B12 to B32, or B13 to B33 of the same column may be applied to the touch sensing controller 200a through different channels CH1 to CH3. For example, a sensing signal sensed by the first electrode B11 of a first row from among the first electrodes B11, B21, and B31 of a first column may be applied to the touch sensing controller 200a through the first channel CH1, a sensing signal sensed by the first electrode B21 of a second row may be applied to the touch sensing controller 200a through the third channel CH3, and a sensing signal sensed by the first electrode B31 of a third row may be applied to the touch sensing controller 200a through the second channel CH2. Although as described above, the sensing signals sensed by the first electrodes B11 to B31, B12 to B32, or B13 to B33 of the same column are applied to the touch sensing controller 200a through different channels CH1 to CH3, the touch sensing controller 200a may compensate for mismatch of positions of the first electrodes B11 to B33 in the sensing area 110 with positions, in which the touch data D_B11 to D_B33 are to be stored if the first electrodes B11 to B31, B12 to B32, or B13 to B33 of the same column are connected to the same channel wire, so that the touch data D_B11 to D_B31, D_B12 to D_B32, or D_B13 to D_B33 based on the sensing signals may be stored in areas M11 to M31, M12 to M32, or M13 to M33 of the same column on the data memory 220. To this end, the touch sensing controller 200a may include a data mapping unit 210 to compensate for the position mismatch described above.

The data mapping unit 210 may control the generation of the touch data D_B11 to D_B33 or the storage of the touch data D_B11 to D_B33 so that the touch data D_B11 to D_B33 may be stored based on positions of the first electrodes B11 to B33, e.g., coordinates of the first electrodes B11 to B33 when the touch data D_B11 to D_B33 is stored in a storage such as the data memory 220.

For example, when a sensing signal sensed by the first electrode B11 at the first column position of the first row is applied through the first channel CH1, the touch data D_B11 corresponding to the sensing signal sensed by the first electrode B11 may be stored in an area M11 at a first column position of a first row of the data memory 220. When a sensing signal sensed by the first electrode B21 at the first column position of the second row is applied through the third channel CH3, the touch data D_B21 corresponding to the sensing signal sensed by the first electrode B21 may be stored in an area M21 at a first column position of a second row of the data memory 220 rather than an area M23 positioned in a third column of the second row of the data memory 220. Similarly, when a sensing signal sensed by the first electrode B31 at the first column position of the third row is applied through the second channel CH2, the touch data D_B31 corresponding to the sensing signal sensed by the first electrode B31 may be stored in an area M31 at a first column position of a third row of the data memory 220 rather than an area M32 positioned in a second column of the third row of the data memory 220. In this manner, the touch data D_B11, D_B21, and D_B31 corresponding to the first electrodes B11, B21, and B31 of the same column may be stored in the areas M11, M21, and M31 positioned in the same column in the data memory 220. In this case, the data mapping unit 210 may compensate for mismatch of positions of the first electrodes B11 to B33 in the sensing area 110 with positions, in which the touch data D_B11 to D_B33 is stored, if the first electrodes B11 to B31, B12 to B32, or B13 to B33 of the same column are connected to the same channel wire, by controlling the generation of the touch data D_B11 to D_B33 or the storage of the touch data D_B11 to D_B33 based on a touch driving timing signal TDTS and channel wiring connection information CWCI. The touch driving timing signal TDTS may be at least one of a signal indicating the start of the driving of driving electrodes, e.g., the second electrodes 112, a signal indicating the end of the driving of the second electrodes 112, and a signal indicating positions of the second electrodes 112. The channel wiring connection information CWCI may be information indicating a connection relation between the first electrodes B11 to B33 of the touch screen panel 100 and the channel wires Wa of the touch screen panel 100. For example, when the touch driving timing signal TDTS indicates that the second electrode 112 of a first row on the touch screen panel 100 is driven, the channel wiring connection information CWCI may include a connection relation between the first electrodes B11, B12, and B13 of the first row, which form sensing nodes, such as the sensing nodes 10 of FIG. 2, along with the driven second electrode 112, and the channel wires Wa. The touch sensing controller 200a may include a look-up table including the channel wiring connection information CWCI.

As described above, the data mapping unit 210 may compensate for position mismatch between the sensing area 110 and the data memory 220, so that the touch data D_B11 to D_B33 may be stored in the data memory 220 based on the positions of the corresponding first electrodes B11 to B33. Thus, the touch data D_B11 to D_B33 may be rearranged according to the positions of the corresponding first electrodes B11 to B33, i.e., the rows and columns of the first electrodes B11 to B33, and then may be stored in the data memory 220.

Although in FIG. 5, the data memory 220 is included in the touch sensing controller 200a, the inventive concept is not limited thereto and the data memory 220 may be formed independent of the touch sensing controller 200a.

Figure 6:
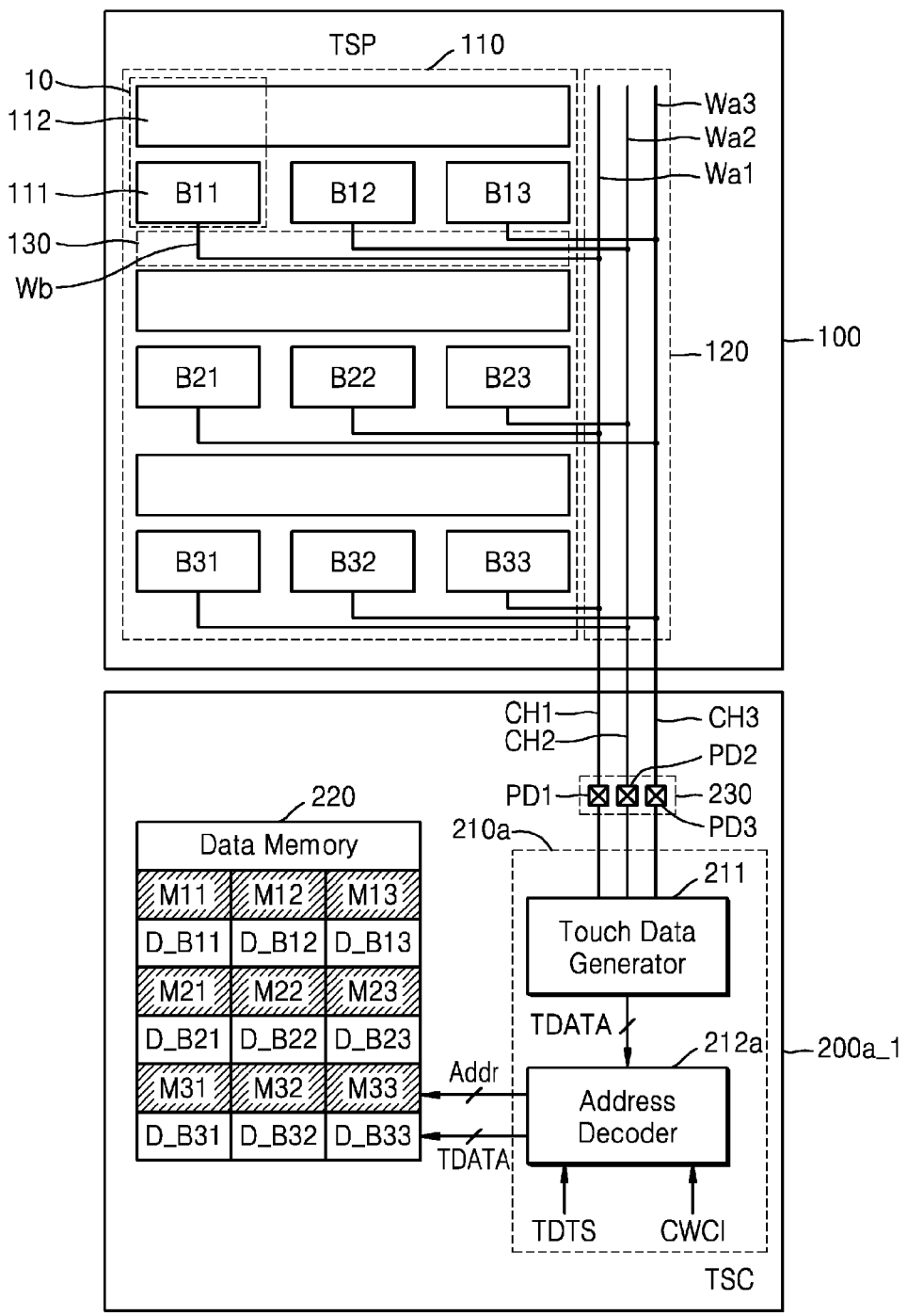
FIG. 6 is a block diagram illustrating an implementation example of the touch sensing controller of FIG. 5.

FIG. 6 is a block diagram illustrating an implementation example of the touch sensing controller 200a of FIG. 5. In FIG. 6, for convenience of explanation, a touch screen panel 100, in which the electrode arrangement and wiring thereof are simplified, is illustrated together with a touch sensing controller 200a_1, and signals that are sensed by a plurality of first electrodes 111 are provided to the touch sensing controller 200a_1 through three channels CH1, CH2, and CH3.

Referring to FIG. 6, the touch sensing controller 200a_1 includes a pad unit 230 and a data mapping unit 210a, and may further include a data memory 220.

The pad unit 230 includes a plurality of pads PD1 to PD3 that receive sensing signals that are provided from the touch screen panel 100 through the channels CH1 to CH3, respectively. The sensing signals received by the pads PD1 to PD3 are provided to the data mapping unit 210a. In the current embodiment, the pad unit 230 includes three pads that are connected to three channels. However, the inventive concept is not limited thereto, and the number of channels and the number of pads may be changed. Also, it is not necessary for the number of channels to be the same as the number of pads.

The data mapping unit 210a may include a touch data generator 211 and an address decoder 212a, may generate touch data TDATA based on the sensing signals, and may store the touch data TDATA in the data memory 220. In this case, the data mapping unit 210a may store the touch data TDATA in the data memory 220 based on coordinates of corresponding first electrodes 111.

The touch data generator 211 receives and amplifies the plurality of sensing signals provided from the touch screen panel 100 through the channels CH1 to CH3. Also, the touch data generator 211 converts the amplified sensing signals into digital signals to generate the touch data TDATA. The touch data generator 211 may transmit the touch data TDATA to the address decoder 212a in series or in parallel.

The address decoder 212a may designate addresses Addr of the touch data TDATA based on control signals, such as a touch driving timing signal TDTS, channel wiring connection information CWCI, and the like. The address decoder 212a may determine whether the touch data TDATA received from the touch data generator 211 corresponds to sensing nodes 10 (or first electrodes 111) of which row, based on the touch driving timing signal TDTS, and may designate column addresses of the touch data TDATA based on the channel wiring connection information CWCI of first electrodes 111 corresponding to the sensing nodes 10. For example, the address decoder 212a may designate row addresses of the touch data TDATA based on the touch driving timing signal TDTS, and may designate column addresses of the touch data TDATA based on the channel wiring connection information CWCI.

The data memory 220 may store touch data TDATA corresponding to at least one frame of the touch screen panel 100, and may store the touch data TDATA based on the addresses Addr that are provided from the address decoder 212a. Accordingly, as illustrated in FIG. 6, the touch data TDATA may be stored in the data memory 220 based on a row and column arrangement of the corresponding first electrodes 111. The data memory 220 may be a frame memory, and may be implemented by any of various memories, such as static random access memory (SRAM), dynamic random access memory (DRAM), a resistor, and the like.

In this manner, the touch sensing controller 200a_1 matches positions of the data memory 220, in which the touch data TDATA is stored, to positions of the first electrodes 111 on the touch screen panel 110 by generating the touch data TDATA based on the sensing signals and then designating the addresses Addr of the touch data TDATA based on the control signals, such as the touch driving timing signal TDTS, the channel wiring connection information CWCI, and the like.

Figure 7:
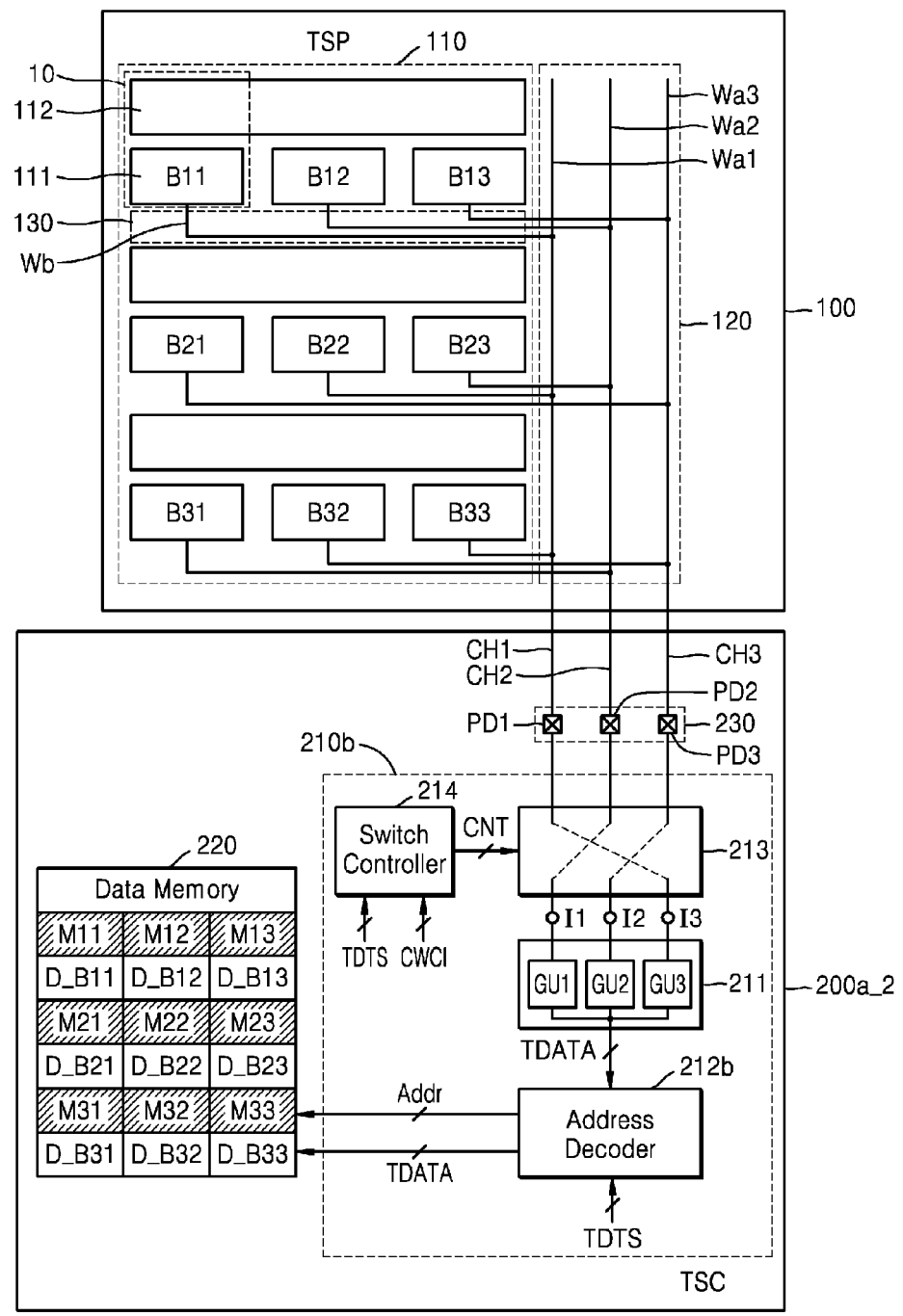
FIG. 7 is a block diagram illustrating another implementation example of the touch sensing controller of FIG. 5.

FIG. 7 is a block diagram illustrating another implementation example of the touch sensing controller 200a of FIG. 5.

Referring to FIG. 7, a touch sensing controller 200a_2 includes a pad unit 230 and a data mapping unit 210b. The touch sensing controller 200a_2 may further include a data memory 220.

The pad unit 230 may include a plurality of pads PD1 to PD3 corresponding to a plurality of channels CH1 to CH3, respectively. The plurality of pads PD1 to PD3 may receive sensing signals, which are provided from a touch screen panel 100 through the channels CH1 to CH3, and may transmit the received sensing signals to the data mapping unit 210b.

The data mapping unit 210b may include a switching unit 213, a switching controller 214, a touch data generator 211, and an address decoder 212b. The data mapping unit 210b may generate touch data TDATA based on the sensing signals, and may store the generated touch data TDATA in the data memory 220. In this case, the data mapping unit 210b may store the touch data TDATA in the data memory 220 based on coordinates of corresponding first electrodes 111.

The touch data generator 211 may amplify the sensing signals, which are received through a plurality of input terminals I1 to I3, to generate the touch data TDATA. The touch data generator 211 may include a plurality of touch data generating units GU1 to GU3 that are connected to the plurality of input terminals I1 to I3, respectively. The plurality of touch data generating units GU1 to GU3 may generate the touch data TDATA by processing the sensing signals, which are received through the plurality of input terminals I1 to I3, in parallel.

The switching unit 213 may switch connections between the pads PD1 to PD3 and the input terminals I1 to I3 of the touch data generator 211 in response to a switching control signal CNT. That is, the switching unit 213 may connect the pads PD1 to PD3 to the input terminals I1 to I3 of the touch data generator 211 by using a point-to-point method, and a connection relation of the switching unit 213 may be changed in response to a switching control signal CNT. For example, the switching unit 213 may include a plurality of switches that are connected between the pads PD1 to PD3 and the input terminals I1 to I3 of the touch data generator 211, and connections between the pads PD1 to PD3 and the input terminals I1 to I3 of the touch data generator 211 may be switched when each of the plurality of switches is turned on or off in response to the switching control signal CNT.

The switching controller 214 generates the switching control signal CNT based on a touch driving timing signal TDTS and channel wiring connection information CWCI, such that although sensing signals received from first electrodes 111 of the same column are received through different pads PD1 to PD3, the sensing signals may be provided to the same input terminal from among the input terminals I1 to I3 of the touch data generator 211. For example, based on channel wiring connection information CWCI of first electrodes B11 to B13, B21 to B23, or B31 to B33 of a row which the touch driving timing signal TDTS indicates, the switching controller 214 may generate the switching control signal CNT for controlling the switching unit 213, such that sensing signals from the first electrodes B11 to B31 of a first column are provided to a first input terminal, i.e., the input terminal I1, sensing signals from the first electrodes B12 to B32 of a second column are provided to a second input terminal, i.e., the input terminal I2, and sensing signals from the first electrodes B13 to B33 of a third column are provided to a third input terminal, i.e., the input terminal I3.

The address decoder 212b may designate addresses with respect to the touch data TDATA generated from the touch data generator 211, based on the touch driving timing signal TDTS. For example, the address decoder 212b may determine whether the touch data TDATA received from the touch data generator 211 corresponds to first electrodes 111 of which row, based on the touch driving timing signal TDTS, and may designate row addresses of the touch data TDATA based on a result of the determination. In this case, the address decoder 212b may designate the same column address with respect to touch data that is generated from the same touch generating unit from among the touch data generating units GU1 to GU3. Also, when touch data generated from the touch data generating units GU1 to GU3 are received in turn, the address decoder 212b may designate column addresses based on the order of receiving touch data.

The data memory 220 may store the touch data TDATA at positions based on the designated addresses. The data memory 220 may store the touch data TDATA corresponding to at least one frame.

The touch sensing controllers 200a, 200a_1, and 200a_2 according to the embodiments of the inventive concept, which compensates for the position mismatch, has been described above with reference to FIGS. 5 to 7. As described above, the touch sensing controller 200a may compensate for the position mismatch by designating addresses of the touch data TDATA based on the touch driving timing signal TDTS and the channel wiring connection information CWCI after the generation of the touch data TDATA (the example of FIG. 6) or changing the order of the sensing signals that are applied to the touch data generator 211 before the generation of the touch data TDATA (the example of FIG. 7). In addition, the touch sensing controller 200a may use various methods to compensate for the position mismatch.

Figure 8:
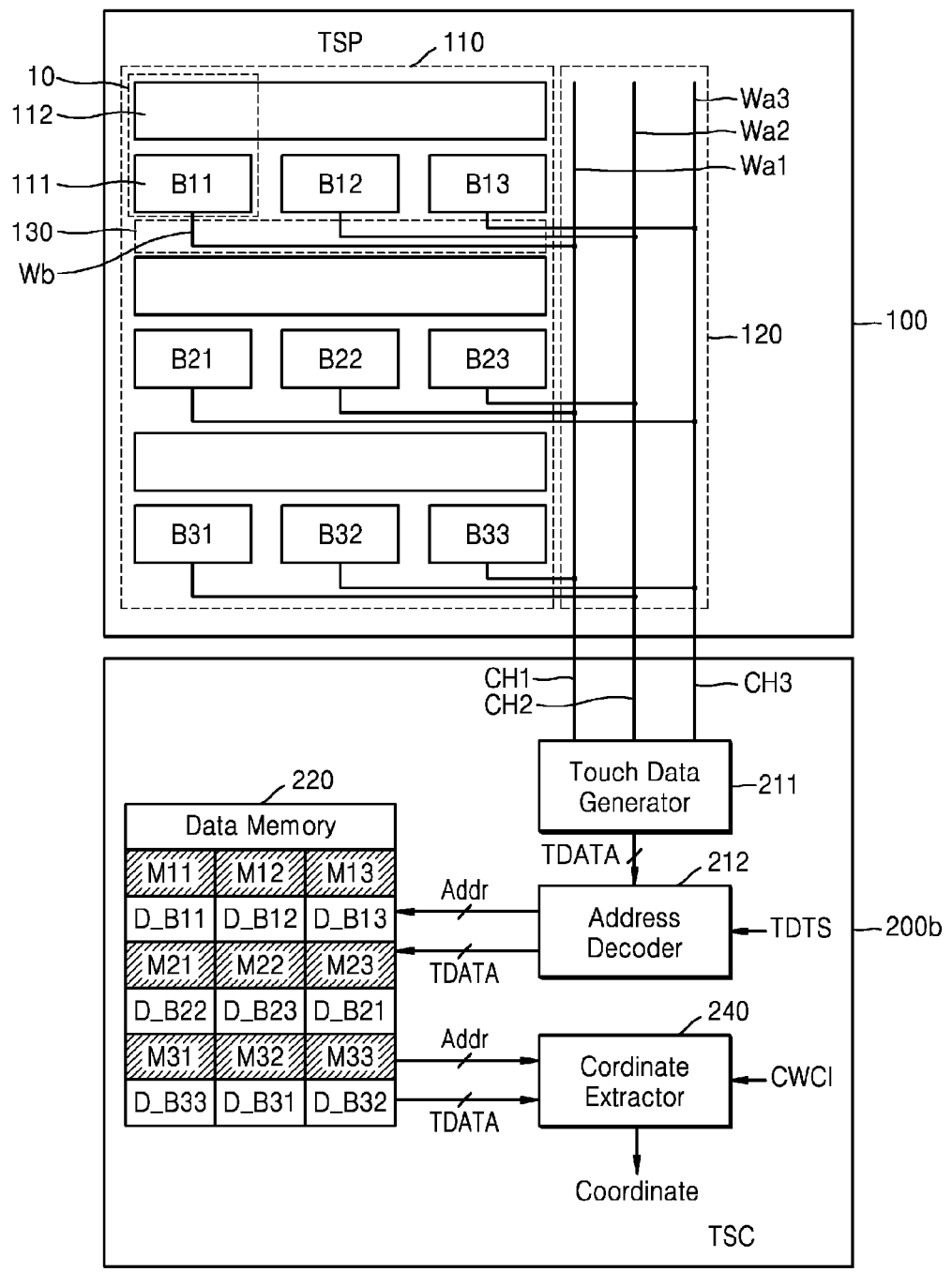
FIG. 8 is a block diagram illustrating another example of the touch sensing controller of FIG. 4.

FIG. 8 is a block diagram illustrating another example of the touch sensing controller 200 of FIG. 4. In FIG. 8, for convenience of explanation, a touch screen panel 100 is illustrated together with a touch sensing controller 200b. Referring to FIG. 8, the touch sensing controller 200b may include a touch data generator 211, an address decoder 212, a data memory 220, and a coordinate extractor 240.

The touch data generator 211 generates touch data TDATA corresponding to first electrodes 111 of the touch screen panel 100 based on sensing signals that are received through a plurality of channels CH1 to CH3.

The address decoder 212 may designate addresses Addr with respect to the touch data TDATA generated from the touch data generator 211, based on a touch driving timing signal TDTS.

The data memory 220 may store touch data TDATA corresponding to at least one frame, and may store the touch data TDATA in positions which the addresses Addr designate.

The coordinate extractor 240 reads the touch data TDATA stored in the data memory 220, and extracts coordinates in which a touch occurred, based on the read touch data TDATA. The coordinate extractor 240 calculates touch coordinates by using touch data corresponding to adjacent electrodes on the touch screen panel 100, e.g., first electrodes 111 of adjacent rows and columns of the touch screen panel 100. However, due to a wiring structure of the touch screen panel 100, i.e., a connection between the first electrodes 111 (B11 to B33) and channel wires Wa, sensing signals sensed by the first electrodes B11 to B31, B12 to B32, or B13 to B33 of the same column are provided to the touch sensing controller 200b through different channels CH1 to CH3. The provided sensing signals are converted into the touch data TDATA, and the touch data TDATA is stored in the data memory 220. Thus, positions in which the touch data TDATA is stored in the data memory 220 do not correspond to positions (i.e., rows and columns) of the first electrodes 111 of the touch screen panel 100. Thus, when the coordinate extractor 240 reads the touch data TDATA from the data memory 220 and then uses the read touch data TDATA, the coordinate extractor 240 has to rearrange the touch data TDATA to make the touch data TDATA correspond to the rows and columns of the first electrodes 111 of the touch screen panel 100. The coordinate extractor 240 may receive the touch data TDATA and the addresses Addr corresponding to the touch data TDATA, may rearrange the touch data TDATA to make the touch data TDATA correspond to the rows and columns of the first electrodes 111 of the touch screen panel 100, based on the addresses Addr and channel wiring connection information CWCI, and may extract touch coordinates by using the rearranged touch data. For example, when the coordinate extractor 240 reads the touch data TDATA to a register (not shown) therein, the coordinate extractor 240 may arrange the touch data TDATA according to the order of corresponding first electrodes 111, based on the addresses Addr and the channel wiring connection information CWCI.

As described above, the touch sensing controller 200b according to the embodiment of the inventive concept converts sensing signals received through the channels CH1 to CH3 into the touch data TDATA, and stores the touch data TDATA in the data memory 200. Then, the touch sensing controller 200b may rearrange the touch data TDATA based on positions of corresponding first electrodes 111 of the touch screen panel 100, and may calculate touch coordinates by using the rearranged touch data.

Figure 9:
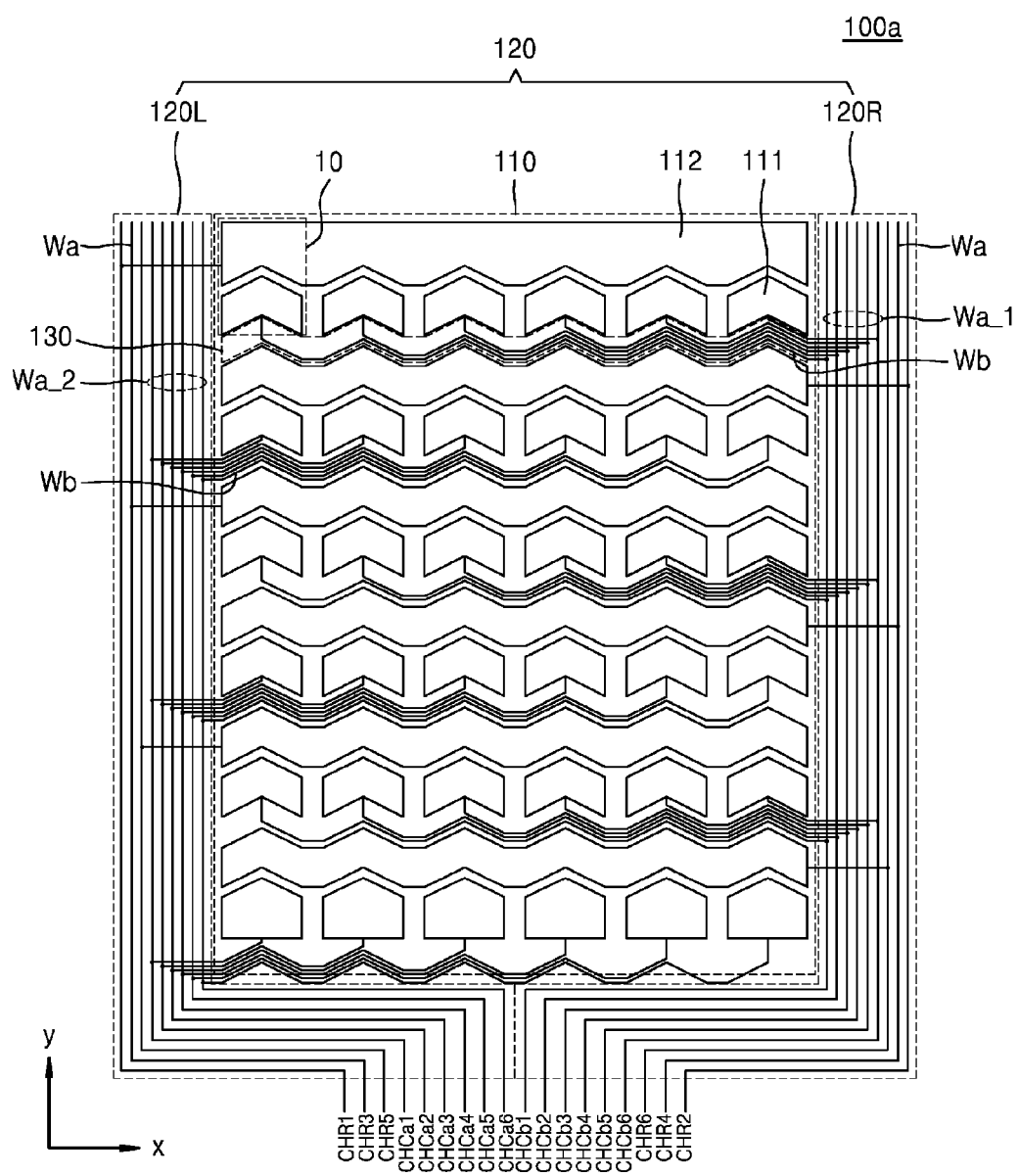
FIG. 9 is a diagram illustrating a touch screen panel according to another exemplary embodiment of the inventive concept.

FIG. 9 is a diagram illustrating a touch screen panel 100a according to another exemplary embodiment of the inventive concept.

Referring to FIG. 9, the touch screen panel 100a may include a sensing area 110 in which a touch occurs, and a channel wiring area 120 that is around the sensing area 110. A plurality of first electrodes 111 that determine a position of a touch in a first direction (e.g., the x-axis direction), and a plurality of second electrodes 112 that determine a position of the touch in a second direction (e.g., the y-axis direction) may be arranged in the sensing area 110. An electrode wiring area 130 may be in a portion of the sensing area 110, and may include electrode wires Wb connected to each of the first and second electrodes 111 and 112. The electrode wiring area 130 may be between the first electrodes 111 and the second electrodes 112.

The channel wiring area 120 may be around the sensing area 110 and may include a plurality of channel wires Wa. The channel wiring area 120 may include a first channel wiring area 120R that is around the right side of the sensing area 110, and a second channel wiring area 120L that is around the left side of the sensing area 110.

The forms and alignments of the plurality of first electrodes 111, the plurality of second electrodes 112, the channel wires Wa are similar to those of the touch screen panel 100 of FIG. 1, and thus, repeated descriptions thereof are omitted. In the wiring structure of the touch screen panel 100a, however, parasitic capacitance of channels CHCa1 to CHCa6 may be the same as parasitic capacitance of CHCb1 to CHCb6, and thus, touch sensing characteristics may be improved in a manner differently from in the touch screen panel 100 of FIG. 1.

The plurality of first electrodes 111 may be divided into a plurality of groups according to the y-axis direction. The first electrodes 111 of odd groups of the plurality of groups may be connected to first channel wires Wa_1 formed on the first channel wiring area 120R, and the first electrodes 111 of even groups of the plurality of groups may be connected to second channel wires Wa_2 formed on the second channel wiring area 120L.

For example, the plurality of first electrodes 111 may be divided by a predetermined "k" row unit, and the first electrodes 111 of the odd groups and the first electrodes 111 of the even groups may be alternately connected to the first channel wires Wa_1 formed on the first channel wiring area 120R and the second channel wires Wa_2 formed on the second channel wiring area 120L, respectively. In this case, if the plurality of first electrodes 111 are arranged in "m" rows in the y-axis direction, "k" may be a natural number that is greater than or equal to 1 and is equal to or less than m/2.

FIG. 9 illustrates a case where "k" is 1 and "m" is 6. The plurality of first electrodes 111 may be divided by one row unit, first electrodes 111 arranged in the odd groups, i.e., first, third, and fifth rows, may be respectively connected to the first channel wires Wa_1 on the first channel wiring area 120R, and first electrodes 111 arranged in the even groups, i.e., second, fourth, and sixth rows, may be respectively connected to the second channel wires Wa_2 on the second channel wiring area 120L. If "k" is 2, first electrodes 111 included in the first and second rows may be classified in a first group, first electrodes 111 included in the third and fourth rows may be classified in a second group, and first electrodes 111 included in the fifth and sixth rows may be classified in a third group. In this case, the first electrodes 111 that are included in odd groups, i.e., the first and third groups, may be respectively connected to the first channel wires Wa_1 on the first channel wiring area 120R, and first electrodes 111 that are included in an even group, i.e., the second group, may be respectively connected to the second channel wires Wa_2 on the second channel wiring area 120L. The number of first channel wires Wa_1 and the number of second channel wires Wa_2 may be equal to each other so that the touch screen panel 100a has symmetrical characteristics.

The plurality of first channel wires Wa_1 in the first channel wiring area 120R and the plurality of second channel wires Wa_2 in the second channel wiring area 120L may have unsymmetrical characteristics due to factors such as process variation. In this case, if first electrodes 111 disposed on the left side from the center of the x-axis are connected to the second channel wires Wa_2 on the second channel wiring area 120L and first electrodes 111 disposed on the right side from the center of the x-axis are connected to the first channel wires Wa_1 on the first channel wiring area 120R, touch sensing characteristics may deteriorate at a boundary portion between the left side of the sensing area 110 and the right side of the sensing area 110.

However, in the touch screen panel 100a according to the current embodiment, touch sensing characteristics may be prevented from being deteriorated at a boundary on the x-axis since the first electrodes 111 arranged in the same row are connected to the first or second channel wires Wa_1 or Wa_2 in the same channel wiring area 120R or 120L. In addition, since the channel wiring areas 120R and 120L are disposed at both sides of the sensing area 110 and are alternately wired, the thickness of one of the two sides of the sensing area 110 may be prevented from being thicker than the thickness of the other one. In addition, such a wiring results in current distribution during a touch sensing, and thus provides an effect of reducing noise in wires.

Figure 10:
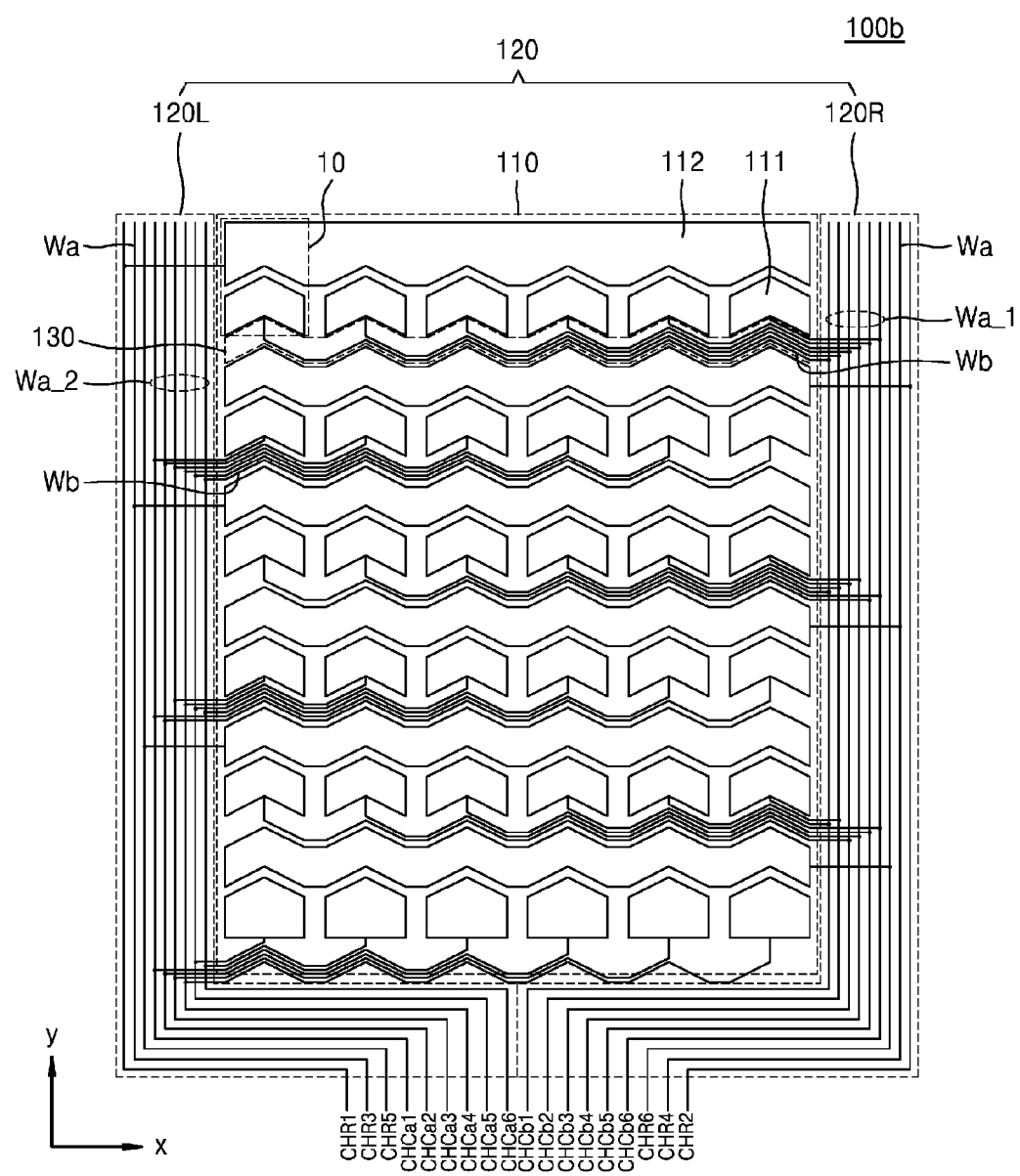
FIG. 10 is a diagram illustrating a touch screen panel according to another exemplary embodiment of the inventive concept.

FIG. 10 is a diagram illustrating a touch screen panel 100b according to another exemplary embodiment of the inventive concept.

Comparing the touch screen panel 100b of FIG. 10 and the touch screen panel 100a of FIG. 9, the difference is in a wiring structure of the first electrodes 111. In the touch screen panel 100a of FIG. 9, the first electrodes 111 arranged on the same position on the x-axis, from among the first electrodes 111 that are included in the same group, are connected to the same channel wire. However, in the touch screen panel 100b of FIG. 10, first electrodes 111 disposed on the same position on the x-axis, from among the first electrodes 111 that are included in the same group, may be connected to different channel wires. In addition, the first electrodes 111 disclosed in different positions on the x-axis and the y-axis may be connected to the same channel wire. Thus, a difference in parasitic capacitance between channels CHCa1 to CHCa6 and CHCb1 to CHCb6 that are connected to the first electrodes 111 may be reduced. That is, parasitic capacitance of channels CHCa1 to CHCa6 may be the same as parasitic capacitance of CHCb1 to CHCb6. Thus, touch sensing characteristics may be improved.

Figure 11:
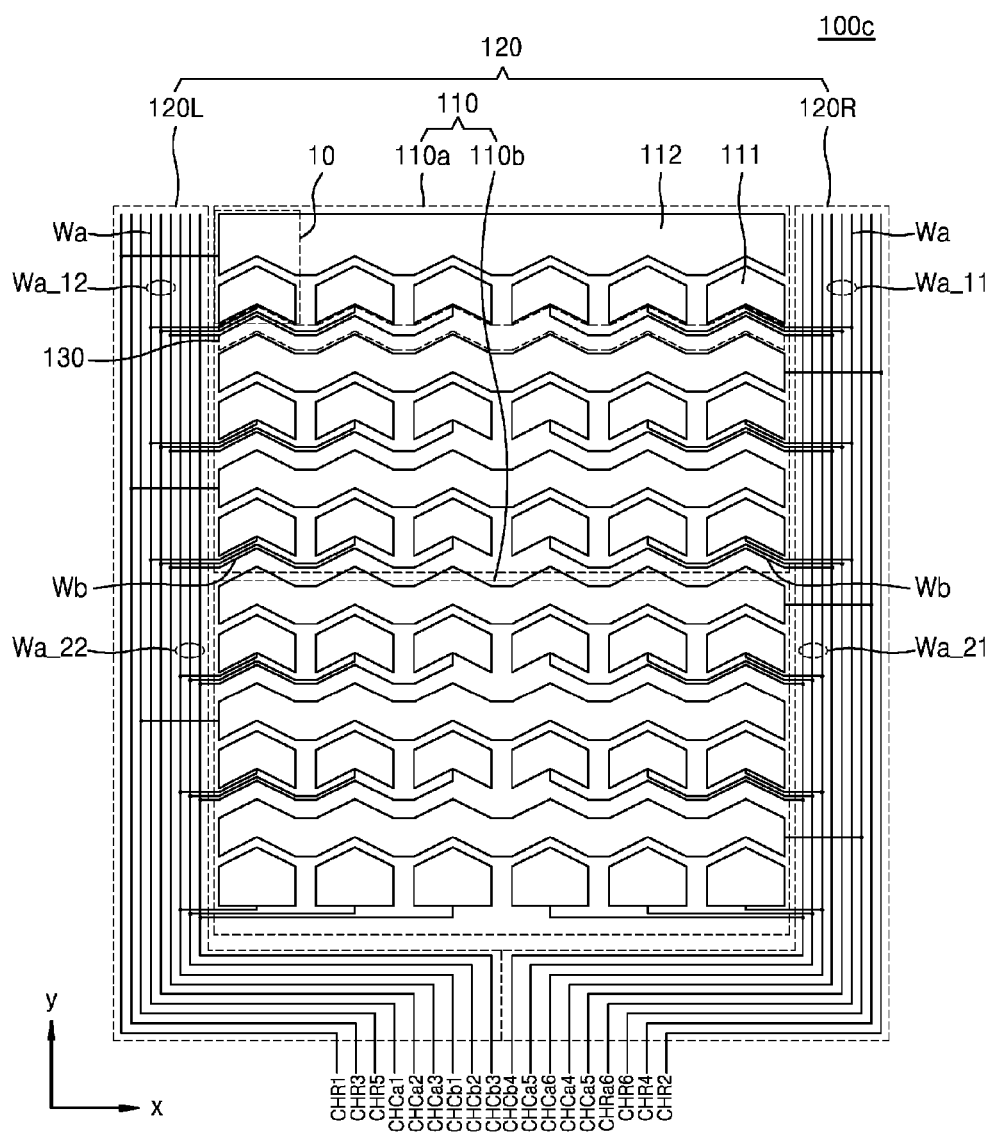
FIG. 11 is a diagram illustrating a touch screen panel according to another exemplary embodiment of the inventive concept.

FIG. 11 is a diagram illustrating a touch screen panel 100c according to another exemplary embodiment of the inventive concept.

Referring to FIG. 11, the touch screen panel 100c may include a sensing area 110 in which a touch occurs, and a channel wiring area 120 that is around the sensing area 110. A plurality of first electrodes 111 that determine a position of a touch in a first direction (e.g., the x-axis direction), and a plurality of second electrodes 112 that determine a position of the touch in a second direction (e.g., the y-axis direction) may be arranged in the sensing area 110. An electrode wiring area 130 may be in a portion of the sensing area 110, and may include electrode wires Wb connected to each of the plurality of first and second electrodes 111 and 112.

The channel wiring area 120 may be around the sensing area 110 and may include a plurality of channel wires Wa.

The forms and alignments of the plurality of first electrodes 111 and the plurality of second electrodes 112 are similar to those of the touch screen panel 100 of FIG. 1, and thus, repeated descriptions thereof are omitted.

The sensing area 110 may be divided into at least two areas, e.g., first and second areas 110a and 110b, according to a position on the y-axis, and thus, the plurality of first electrodes 111 may be divided into at least two groups, each of which is included in one of the at least two areas. In this case, the first electrodes 111 that are included in different groups may be connected to different channel wires in the channel wiring area 120.

Referring to FIG. 11, the sensing area 110 may be divided into the first area 110a that is in the upper portion of the sensing area 110, and the second area 110b that is in the lower portion of the sensing area 110. The first electrodes 111 may be divided into a first group that is included in the first area 110a, and a second group that is included in the second area 110b. The first electrodes 111 of the first group may be connected to channel wires that are different from those to which first electrodes 111 of the second group are connected. The first electrodes 111 of the first group may be connected to first channel wires Wa_11 and Wa_12, and the first electrodes 111 of the second group may be connected to second channel wires Wa_21 and Wa22.

As illustrated in FIG. 11, the channel wiring area 120 may include a first channel wiring area 120R that is around the right side of the sensing area 110 and a second channel wiring area 120L that is around the left side of the sensing area 110. The first electrodes 111 that are on the left side of the sensing area 110 from the center of the x-axis may be connected to the channel wires Wa_12 and Wa_22 that are disposed in the second channel wiring area 120L, and first electrodes 111 that are on the right side of the sensing area 110 from the center of the x-axis may be connected to the first and second channel wires Wa_11 and Wa_21 that are disposed in the first channel wiring area 120R. In addition, the first electrodes 111 disposed in the same column from among the first electrodes 111 that are included in the same group may be connected to the same channel wires.

Although in FIG. 11, the first electrodes 111 are divided into two groups, the inventive concept is not limited thereto. The first electrodes 111 may be divided into three or more groups according to a position on the y-axis, and the three or more groups may be connected to different channel wires. Due to the wiring structure as described above, the variation of touch data based on positions of the first electrodes 111 on the y-axis may be reduced, as described with reference to FIG. 12 below.

Figure 12:
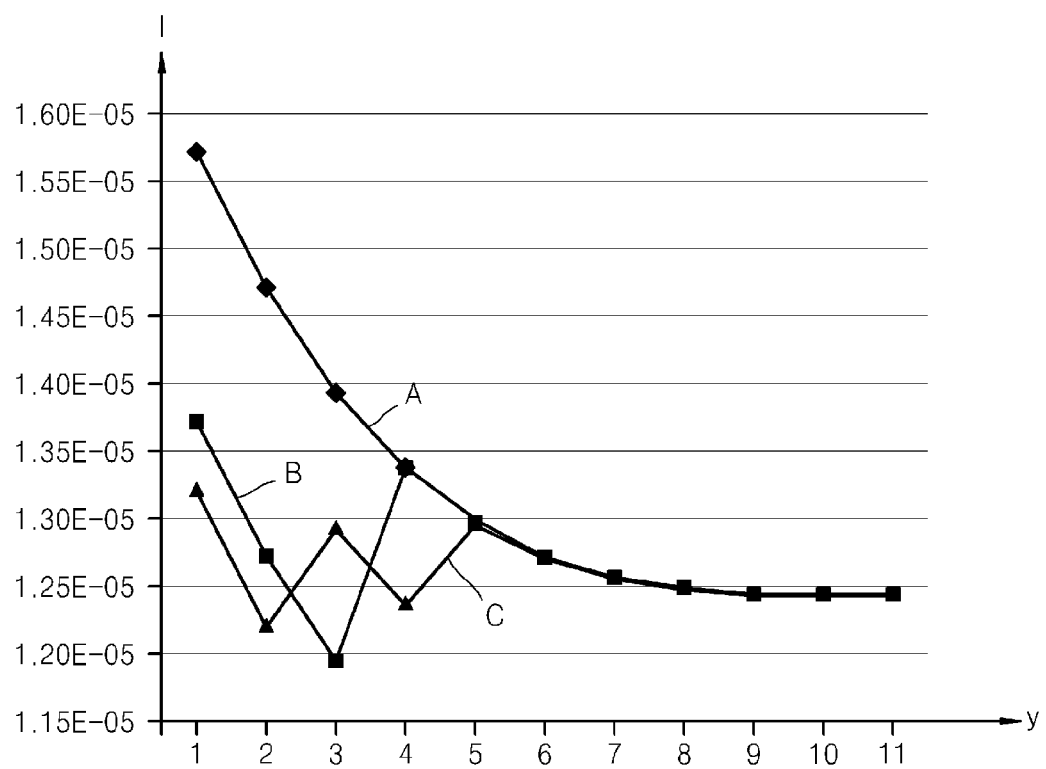
FIG. 12 is a graph illustrating the dispersion of sensing current based on positions of first electrodes on the y-axis, according to an exemplary embodiment.

FIG. 12 is a graph illustrating the dispersion of sensing current based on positions of the first electrodes 111 on the y-axis, according to an exemplary embodiment. Plot A indicates a sensing current based on a conventional wiring structure, and plot B and plot C each indicate a sensing current based on the wiring structure described with reference to FIG. 11. The plot B indicates a sensing current of the case where the first electrodes 111 are divided into two groups, and the plot C indicates a sensing current of the case where the first electrodes 111 are divided into three groups. Referring to FIG. 12, when all the first electrodes 111 that are disposed on the same position on the x-axis are connected to the same channel wire according to the conventional wiring structure, the dispersion of sensing current is very large (see the plot A). However, when the first electrodes 111 that are disposed on the same position on the x-axis are divided into at least two groups according to positions on the y-axis and different groups are connected to different channel wires, the dispersion of sensing current is reduced (see the plots B and C). In particular, the dispersion of sensing current is reduced more when the first electrodes 111 are divided into three groups, compared to when the first electrodes 111 are divided into two groups.

The wiring structure of the touch screen panel 100c of FIG. 11 may reduce the variation of touch data that may be obtained in the touch screen panel 100c, although the size of the touch screen panel 100c is relatively large, electrode resistances are relatively large, or parasitic capacitances are relatively large. Thus, the uniformity of the touch data may be improved, and thus, sensing sensitivities may be improved.

Figure 13:
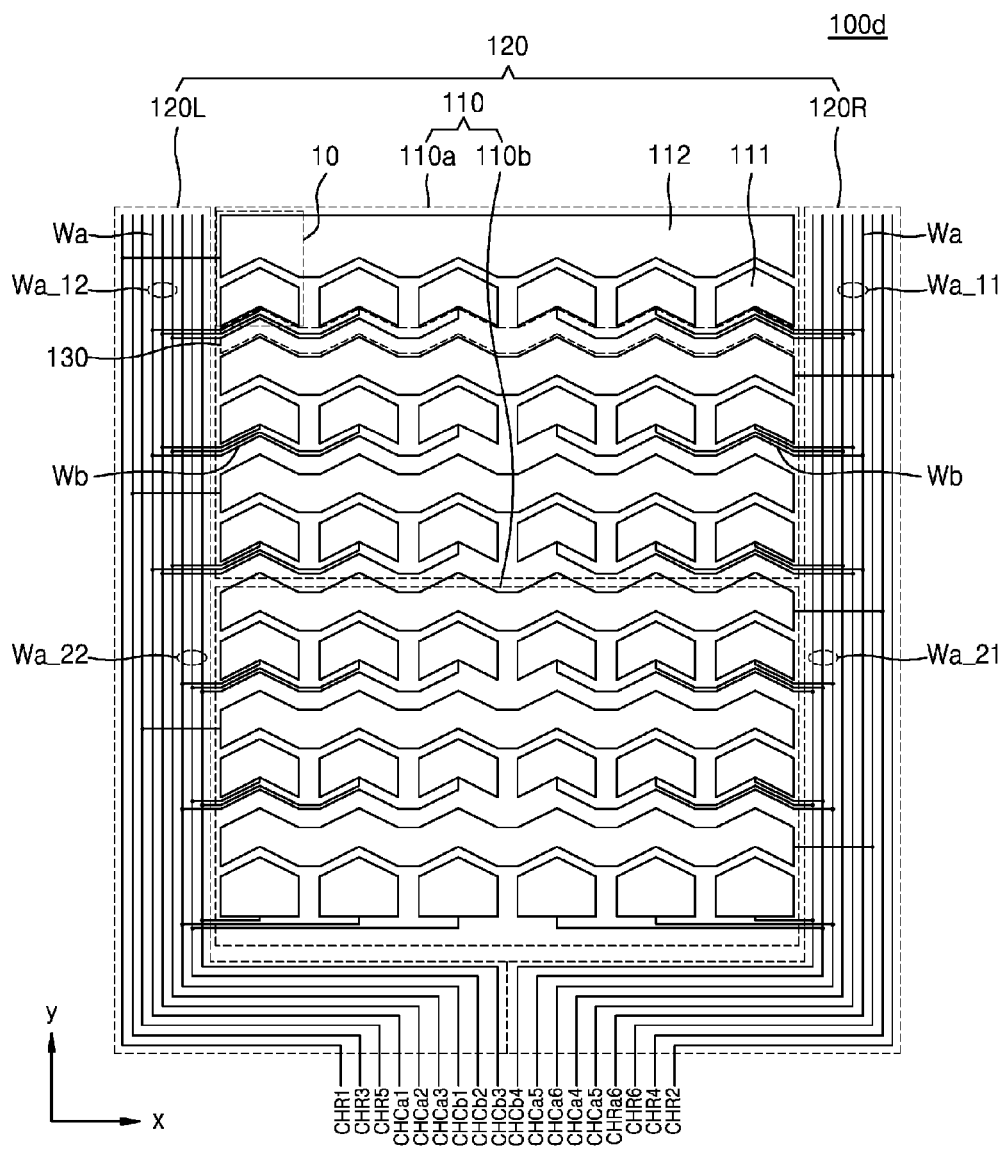
FIG. 13 is a diagram illustrating a touch screen panel according to another exemplary embodiment of the inventive concept.

FIG. 13 is a diagram illustrating a touch screen panel 100d according to another exemplary embodiment of the inventive concept.

Comparing the touch screen panel 100d of FIG. 13 and the touch screen panel 100c of FIG. 11, the difference is in a wiring structure of the first electrodes 111. In the touch screen panel 100c of FIG. 11, the first electrodes 111 disposed on the same position on the x-axis, from among the first electrodes 111 that are included in the same group, are connected to the same channel wire. However, in the touch screen panel 100d of FIG. 13, first electrodes 111 disposed on the same position on the x-axis, from among first electrodes 111 that are included in the same group, may be connected to different channel wires. In addition, first electrodes 111 disposed on different positions on the x-axis and the y-axis may be connected to the same channel wire. However, like in the touch screen panel 100c of FIG. 11, the touch screen panel 100d of FIG. 13 may also provide that a difference in parasitic capacitance between channels CHCa1 to CHCa6 and CHCb1 to CHCb6 that are connected to the first electrodes 111 is reduced, and thus, touch sensing characteristics may be improved.

Figure 14:
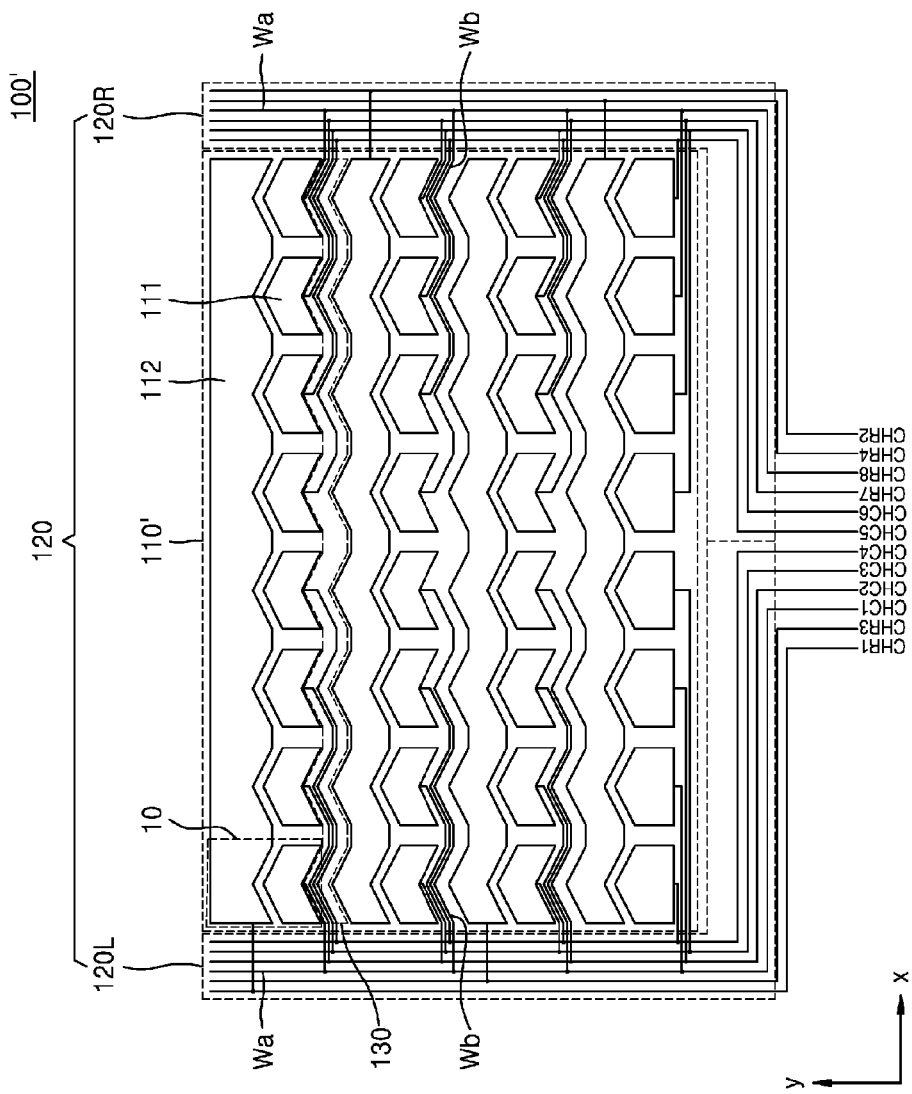
FIG. 14 is a diagram illustrating a touch screen panel according to another exemplary embodiment of the inventive concept.

FIG. 14 is a diagram illustrating a touch screen panel 100' according to another exemplary embodiment of the inventive concept.

Referring to FIG. 14, the touch screen panel 100' may include a sensing area 110' and a channel wiring area 120 that is around the sensing area 110'.

A plurality of first electrodes 111 that determine a position of a touch in a first direction (e.g., the x-axis direction), and a plurality of second electrodes 112 that determine a position of the touch in a second direction (e.g., the y-axis direction) may be arranged in the sensing area 110'. A first electrode 111 and a portion of a second electrode 112 that is adjacent to the first electrode 111 may constitute a sensing node 10. Although in FIG. 14, 4 second electrodes 112 are arranged in the x-axis direction and 32 first electrodes 111 are arranged in the x-axis direction and the y-axis direction, i.e., in a matrix form, the inventive concept is not limited thereto. The number and arrangement of first electrodes 111 and the number and arrangement of second electrodes 112 may be variously modified according to the area of the touch screen panel 100', and the areas of the first and second electrodes 111 and 112, the area of the channel wiring area 120, or the like.

An electrode wiring area 130 may be in a portion of the sensing area 110', and may include electrode wires Wb connected to each of the first and second electrodes 111 and 112. The electrode wiring area 130 may be formed between the first electrode 111 and the second electrode 112 or under the first electrode 111.

The channel wiring area 120 may be around the sensing area 110' and may include a plurality of channel wires Wa. The channel wiring area 120 may include a first channel wiring area 120R that is around the right side of the sensing area 110', and a second channel wiring area 120L that is around the left side of the sensing area 110'.

The first electrodes 111 may be divided into two groups that are disposed on the left and right based on the center on the x-axis, first electrodes 111 included in the right group may be connected to the channel wires Wa in the first channel wiring area 120R, and first electrodes 111 included in the left group may be connected to the channel wires Wa in the second channel wiring area 120L.

The forms and alignments of the plurality of first electrodes 111, the plurality of second electrodes 112, the channel wires Wa are similar to those of the touch screen panel 100 of FIG. 1, and thus, repeated descriptions thereof are omitted.

According to the present embodiment, first electrodes 111 arranged on the same position on the x-axis from among the plurality of first electrodes 111, i.e., first electrodes 111 arranged on the same column, are connected to different channel wires Wa and are not connected to the same channel wire Wa. First electrodes 111 arranged in different rows and columns may be connected to the same channel wire Wa.

Referring to FIG. 14, first electrodes 111 arranged in four columns of the right side of the sensing area 110' from among the plurality of first electrodes 111 arranged in four rows and eight columns may be connected to four channel wires Wa of the first channel wiring area 120R through the electrode wires Wb. First electrodes 111 arranged in four columns of the left side of the sensing area 110' from among the plurality of first electrodes 111 may be connected to four channel wires Wa of the second channel wiring area 120L through the electrode wires Wb. In this case, as illustrated in FIG. 14, first electrodes 111 of four columns arranged in the same row, may be connected to different channel wires Wa, and first electrodes 111 of four rows arranged in the same column may be connected to different channel wires Wa. That is, first electrodes 111 arranged in the same row or in the same column are not connected to the same channel wire Wa. Thus, first electrodes 111 arranged in different rows and different columns may be connected to the same channel wire Wa.

The number of columns may be greater than or equal to twice the number of rows so that first electrodes 111 arranged in the same column are connected to different channel wires Wa. For example, when the plurality of first electrodes 111 are arranged in m rows and n columns (where m and n are natural numbers), n may be greater than or equal to 2*m. In particular, when considering wiring efficiency, the plurality of first electrodes 111 may be arranged so that n is equal to 2*m. Accordingly, a length of the touch screen panel 100' in the x-axis direction may be larger than that of the touch screen panel 100' in the y-axis direction. The touch screen panel 100' according to the present embodiment may be applied to a product having a horizontal length that is larger than a vertical length, for example, a tablet personal computer (PC).

Since the plurality of first electrodes 111 are arranged in four rows and eight columns in the sensing area 110' of the touch screen panel 100' of FIG. 14, the relation in which n is equal to 2*m may be satisfied. The first channel wiring area 120R and the second channel wiring area 120L each may include four channel wires Wa so that eight first electrodes 111 of eight columns arranged in one row are connected to eight channel wires Wa, respectively. First electrodes 111 arranged in four columns of the right side of the sensing area 110' may be connected to different channel wires Wa of the first channel wiring area 120R, and first electrodes 111 arranged in four columns of the left side of the sensing area 110' may be connected to different channel wires Wa of the second channel wiring area 120L. Since the number of rows of the plurality of first electrodes 111 is also four, first electrodes 111 that correspond to four rows and four columns may have different connection relations for each row, and thus, four first electrodes 111 of four columns may be connected to four channel wires Wa, respectively. When the number of columns is twice the number of rows, the number of channel wires Wa, to which first electrodes 111 are connected in each of the first and second channel areas 120R and 120L, is equal to the number of rows, and thus, the layout area of the channel wiring area 120 may be optimized.

As described above, in the touch screen panel 100' of FIG. 14 according to the present embodiment, all the first electrodes 111 arranged in the same position on the x-axis from among the plurality of first electrodes 111 are connected to different channel wires Wa, and thus, first electrodes of each column are evenly connected to channel wires Wa. Accordingly, the degradation of touch sensing characteristics due to the parasitic elements of the channel and electrode wires Wa and Wb may be prevented.

Figure 15:
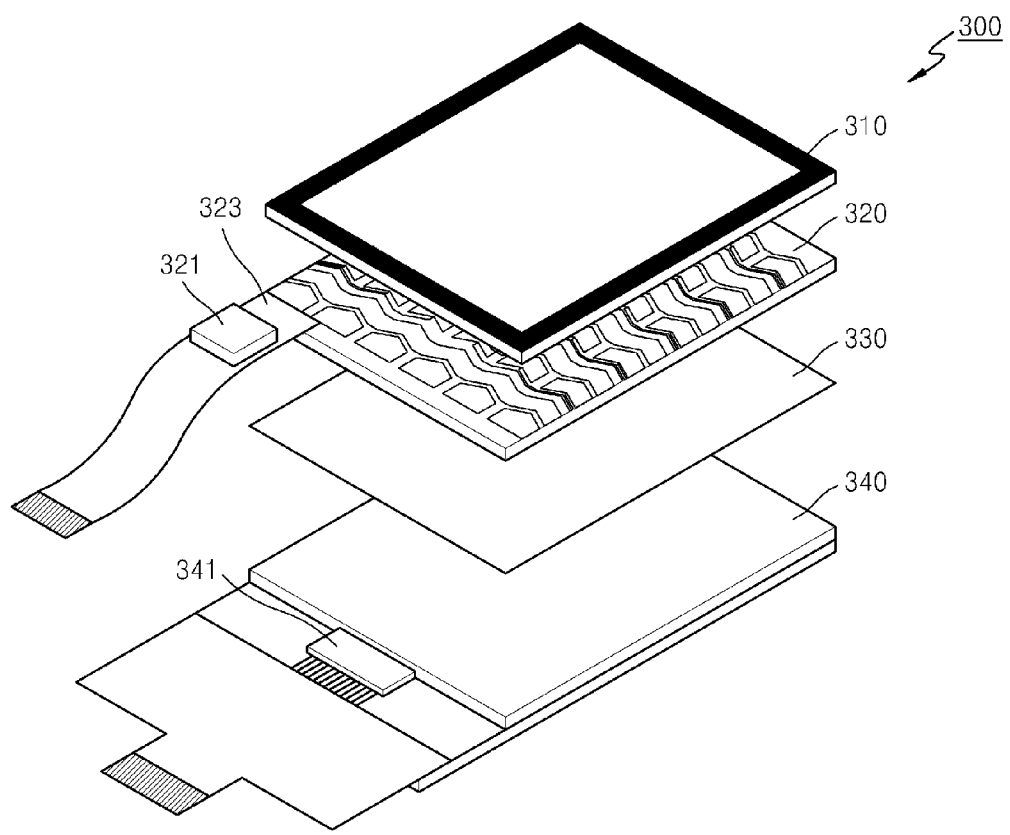
FIG. 15 is a diagram illustrating a structure of a printed circuit board (PCB) of a display apparatus in which a touch screen panel according to any of the above embodiments is mounted, according to an exemplary embodiment of the inventive concept.

FIG. 15 is a diagram illustrating a structure of a PCB of a display apparatus 300 in which a touch screen panel according to any of the above embodiments is mounted, according to an exemplary embodiment of the inventive concept. FIG. 15 illustrates a display apparatus having a structure in which a touch screen panel and a display panel are separated from each other.

Referring to FIG. 15, the display apparatus 300 may include a window glass 310, a touch screen panel 320, and a display panel 340. In addition, a polarizing plate 330 for compensating for optical characteristics may be further disposed between the touch screen panel 320 and the display panel 340.

The window glass 310 is generally formed of a material, such as acryl or tempered glass, so as to protect a module from scratches due to an external shock or repeated touches.

The touch screen panel 320 may be formed by patterning a transparent electrode, such as ITO, on a transparent substrate. The transparent substrate may be formed of polyethylene terephthalate (PET), polycarbonate (PC), polymethyl methacrylate (PMMA), polyethylene naphthalate (PEN), polyethersulfone (PES), cyclic olefin polymer (COC), triacetylcellulose (TAC) film, a polyvinyl alcohol (PVA) film, a polyimide (PI) film, polystyrene (PS), biaxially oriented polystyrene (K resin-containing biaxially oriented polystyrene; BOPS), glass, or tempered glass.

A touch sensing controller 321 may be mounted on a flexible printed circuit board (FPCB) in the form of a chip-on-board (COB). The touch sensing controller 321 detects a change in capacitance from each sensing electrode, e.g., the first electrodes 111 of FIG. 1 and the second electrodes 112 of FIG. 1, to extract touch coordinates and provides extracted touch coordinates to a host controller (not shown).

The display panel 340 is generally formed by combining two sheets of glass consisting of an upper plate and a lower plate. Also, a display driving circuit 341 may be attached to a mobile display panel in the form of a chip-on-glass (COG).

Figure 16:
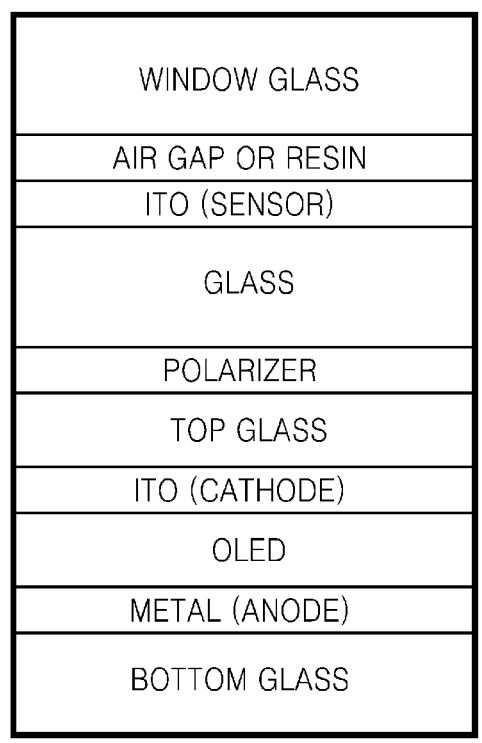
FIG. 16 is a diagram illustrating a structure of a panel of the display apparatus of FIG. 15, according to an exemplary embodiment.

FIG. 16 is a diagram illustrating a structure of a panel of the display apparatus 300 of FIG. 15, according to an exemplary embodiment. FIG. 16 illustrates an organic light-emitting diode (OLED) display as an example of the display apparatus 300. Referring to FIG. 16, a sensing electrode may be formed by patterning a transparent electrode ITO (sensor). The sensing electrode may be formed on a glass substrate that is separated from the display panel 340. The sensing electrode may include first electrodes for determining a position of a touch in a first direction (e.g., the x-axis direction) and second electrodes for determining a position of the touch in a second direction (e.g., the y-axis direction), and the first and second electrodes may be formed on the same side of the same substrate. The glass substrate on which the sensing electrode is formed may be separated from a window glass by a predetermined air gap or resin. Also, the glass substrate may be separated from the top and bottom glasses forming the display panel 340 with respect to a predetermined polarizing plate.

Figure 17:
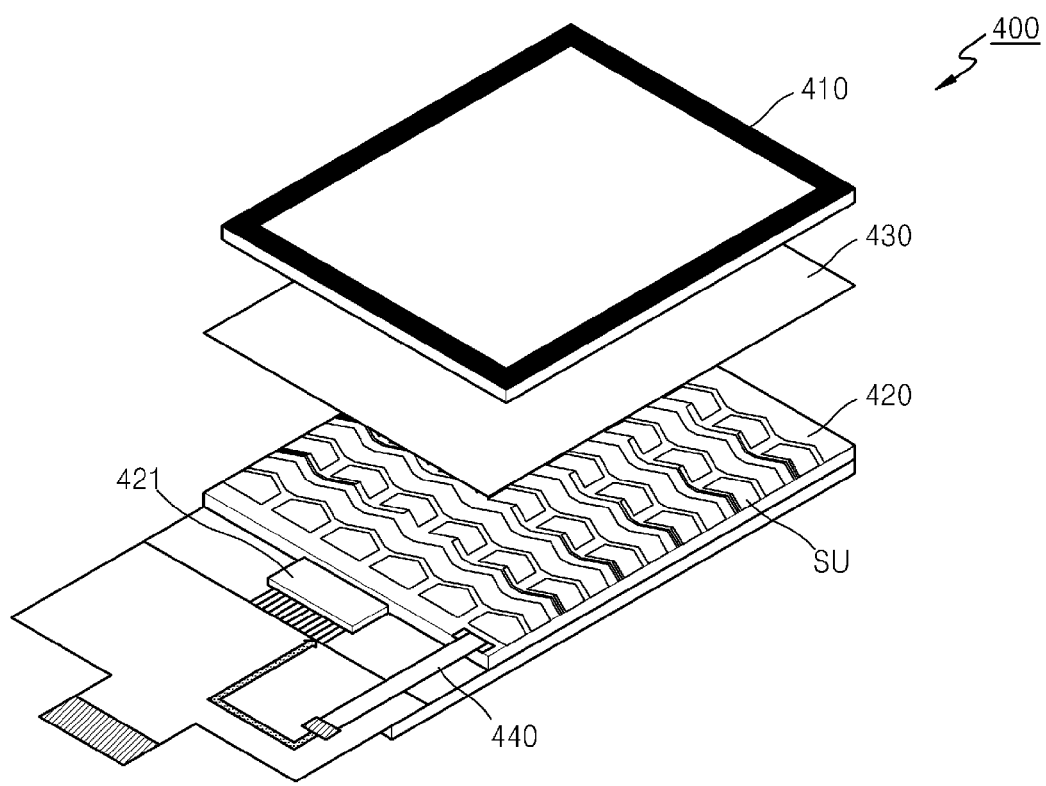
FIG. 17 is a diagram illustrating a structure of a PCB of a display apparatus in which a touch screen panel and a display panel are unified as one body, according to an exemplary embodiment of the inventive concept.
Figure 18:
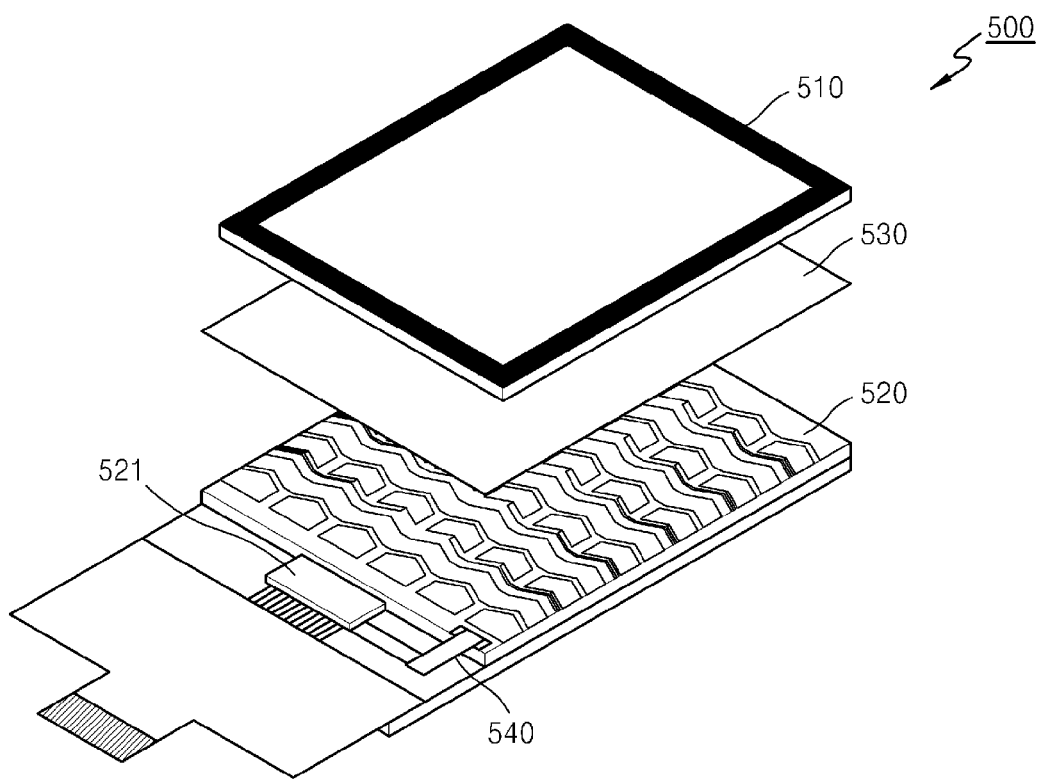
FIG. 18 is a diagram illustrating a structure of a PCB of a display apparatus in which a touch screen panel and a display panel are unified as one body, according to another exemplary embodiment of the inventive concept.

FIG. 17 is a diagram illustrating a structure of a printed circuit board (PCB) of a display apparatus 400 in which a touch screen panel and a display panel 420 are unified as one body, according to an exemplary embodiment of the inventive concept, and FIG. 18 is a diagram illustrating a structure of a PCB of a display apparatus 500 in which a touch screen panel and a display panel 520 are unified as one body, according to another exemplary embodiment of the inventive concept. Referring to FIG. 17, the display apparatus 400 may include a window glass 410, the display panel 420, and a polarizing plate 430. In particular, in embodying a touch screen panel, the touch screen panel may not be formed on a separate glass substrate, but may be formed by patterning a transparent electrode on an upper plate of the display panel 420. FIG. 17 illustrates an example in which a plurality of sensing units SU are formed on the upper plate of the display panel 420. When a panel having the above structure is formed, a single semiconductor chip 421, in which a touch controller and a display driving circuit, are integrated may be employed.

When a touch controller and a display driving circuit are integrated in the single semiconductor chip 421, the single semiconductor chip 421 may include a pad related to touch data and a pad related to image data and gray scale data. The single semiconductor chip 421 receives a voltage signal from the sensing units SU through a conductive line 440 that is connected to one side of a display panel 420. Noise may be reduced when a pad for receiving a voltage signal is disposed at a position adjacent to the conductive line 440 for transmitting the voltage signal when arranging pads on the semiconductor chip 421. Although not illustrated in FIG. 17, when a conductive line for providing gray scale data to the display panel 420 is positioned on the opposite side of the conductive line 440 for delivering the voltage signal of touch data, a pad for providing the gray scale data may also be disposed on the opposite side of the pad for receiving the voltage signal.

FIG. 18 illustrates an example which substantially has a similar structure to that of the display apparatus 400 of FIG. 17 and in which a voltage signal from a sensing unit is not provided to the semiconductor chip 421 through a flexible PCB (FPCB), but provided directly to the semiconductor chip 421 via a conductive line.

Figure 19:
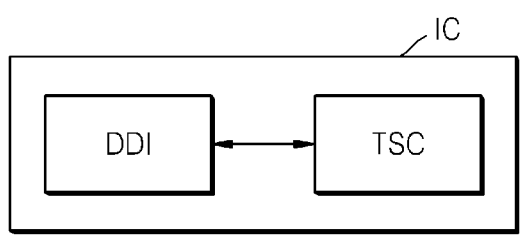
FIG. 19 is a block diagram of a display chip according to an exemplary embodiment of the inventive concept.

FIG. 19 is a block diagram of a display chip integrated circuit (inventive concept) according to an exemplary embodiment of the inventive concept. The display chip IC may include a display driver circuit DDI and a touch sensing controller TSC. The display chip IC receives image data from an external host and receives sensing signals from a touch screen panel. The display driving circuit DDI processes the image data to generate gray scale data for driving a display apparatus, and provides generated gray scale data to a display panel. The touch sensing controller TSC may obtain touch data based on the sensing signal. Also, the touch sensing controller TSC may determine a position of a point where a touch occurred, based on the touch data, and may provide a determined position to the external host. In this case, when sensing signals for the same row or the same column on the touch screen panel are not received via the same channel as described with reference to FIGS. 4 to 8, the touch sensing controller TSC may rearrange touch data, which is obtained from the sensing signals, to make the touch data correspond to positions on the touch screen panel.

The display driving circuit DDI and the touch sensing controller TSC may transmit or receive command signals and timing signals therebetween and may complementarily operate.

The display chip IC, in which the display driving circuit DDI and the touch sensing controller TSC are integrated, may be used not only in the case where a display panel and a touch screen panel are unified as one body, like the display apparatuses 400 and 500 of FIGS. 17 and 18, but also in the case where a display panel and a touch screen panel are separated from each other, like the display apparatus 300 of FIG. 15.

Figure 20:
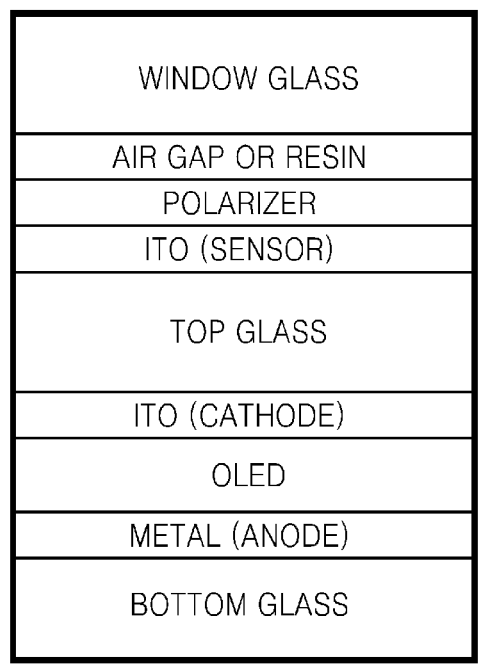
FIG. 20 is a diagram illustrating a structure of a panel of the display apparatuses illustrated in FIGS. 17 and 18, according to an exemplary embodiment.

FIG. 20 illustrates a structure of a panel of the display apparatuses 400 and 500 illustrated in FIGS. 17 and 18, according to an exemplary embodiment. In the display apparatuses 500 and 600, the touch screen panel and the display panel can be efficiently unified with each other as one body. FIG. 20 illustrates an OLED as a display device. A transparent electrode ITO (sensor) is not formed on an additional glass substrate or a PET film but may be directly formed on the top plate (i.e., top glass) of the display panel, as illustrated in FIG. 20. The sensing electrode may include first electrodes for determining a position of a touch in a first direction (e.g., the x-axis direction) and second electrodes for determining a position of the touch in a second direction (e.g., the y-axis direction), and the first and second electrodes may be formed on the top plate of the display panel. In this case, when the touch display panel is realized, production costs and the thickness of a module can be reduced. However, as a distance between the transparent electrode ITO (sensor) and the top plate of the display panel is decreased, vertical parasitic capacitance components of the sensing unit may increase. However, since an effect caused by parasitic capacitance components is reduced according to the embodiments of the inventive concept, the touch screen panel and the display panel can be efficiently unified with each other as one body.

Figure 21:
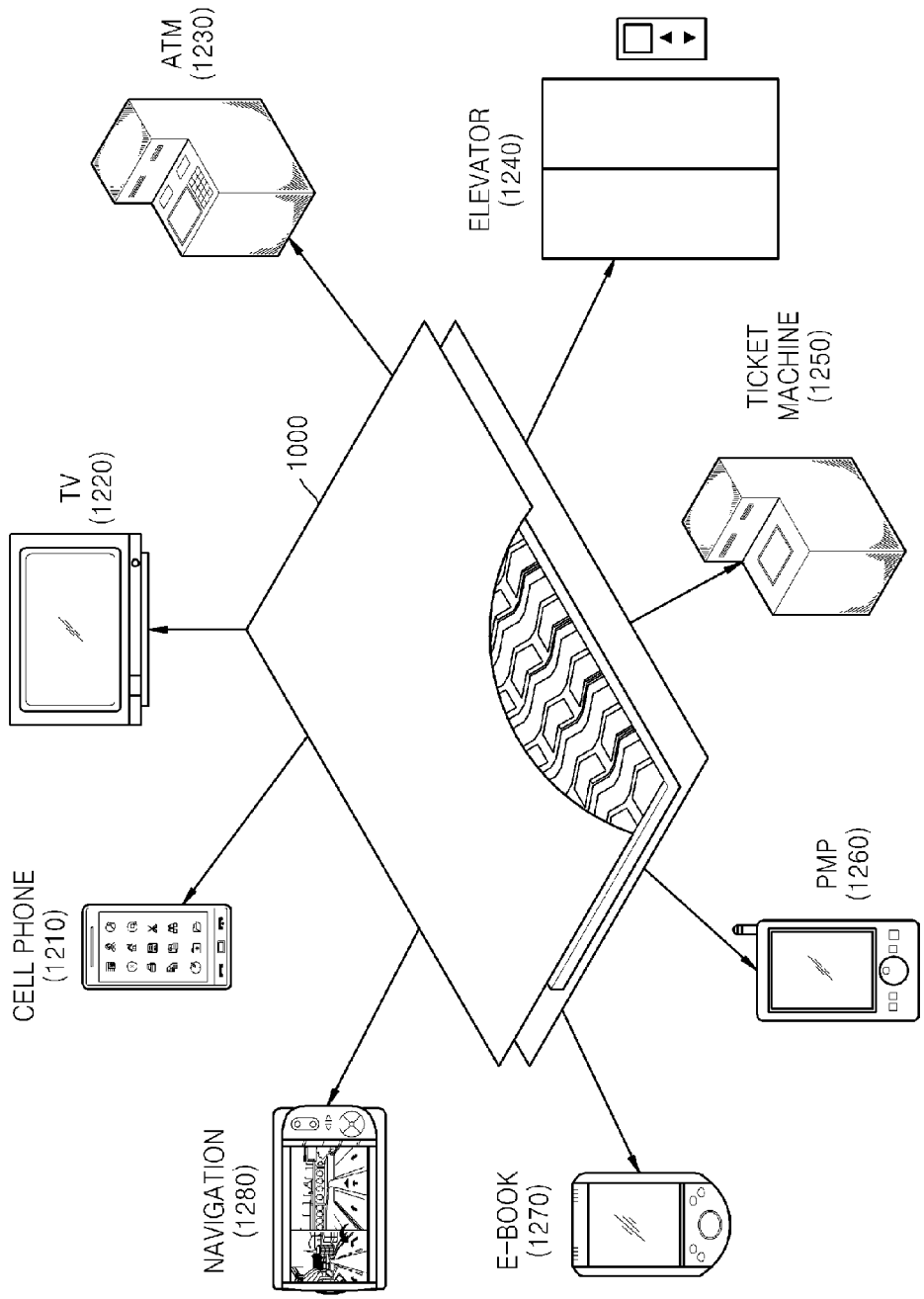
FIG. 21 is a diagram illustrating various application products in which the touch sensing system according to the above embodiment is mounted.

FIG. 21 illustrates various application products in which the touch sensing system 1000 according to the above embodiment is mounted.

Currently, touch screen-type products are used in various fields, and due to their spatial advantages, the touch screen-type products are rapidly replacing button-type devices. The highest demand is required in the mobile phone field, which is led by smart phones. In particular, a mobile phone is very sensitive to not only its convenience but also its terminal size. Thus, it is well known that, recently, a touch phone-type mobile phone that does not have separate keys or that has a minimum number of keys has been on the spotlight. Thus, the touch sensing system 1000 may be applied not only to a cell phone 1210 but also widely applied to a television 1220 employing a touch screen, an automatic teller machine (ATM) 1230 via which a cash deposit or withdrawal can be made, an elevator 1240, a ticket machine 1250 that is used in a subway system or the like, a portable media player (PMP) 1260, an electronic book (e-book) 1270, a navigation system 1280, or the like. In addition, the touch sensing system 1000 may be employed in all fields requiring a user interface.

While the inventive concept has been particularly shown and described with reference to exemplary embodiments thereof, it will be understood that various changes in form and details may be made therein without departing from the spirit and scope of the following claims.

What is claimed is:

1. A touch screen panel comprising:
   a sensing area comprising a plurality of first electrodes arranged in a matrix form in first and second directions of a substrate and a plurality of second electrodes extending in the first direction, the plurality of second electrodes being arranged alternately with the plurality of first electrodes in the second direction;
   a channel wiring area comprising a plurality of channel wires configured to transmit signals of the plurality of first electrodes and signals of the plurality of second electrodes, the channel wiring area being disposed around the sensing area; and
   an electrode wiring area comprising a plurality of electrode wires connecting the plurality of first electrodes and the plurality of second electrodes to the plurality of channel wires, the electrode wiring area being in the sensing area,
   wherein at least two electrodes, from among the first electrodes, that are disposed in a same column are connected to different channel wires.

2. The touch screen panel of claim 1, wherein at least two electrodes, from among the first electrodes, that are disposed in different rows and different columns are connected to a same channel wire.

3. The touch screen panel of claim 1, wherein at least two electrodes disposed in two adjacent rows, respectively, from among the first electrodes, that are disposed in the same column, are connected to different channel wires.

4. The touch screen panel of claim 1, wherein the channel wiring area comprises a first channel wiring area and a second channel wiring area that are disposed around two sides of the sensing area.

5. The touch screen panel of claim 4, wherein the plurality of first electrodes are divided into a first group and a second group according to a position in the first direction, and wherein the first electrodes of the first group are connected to channel wires in the first channel wiring area, and the first electrodes of the second group are connected to channel wires in the second channel wiring area.

6. The touch screen panel of claim 4, wherein the plurality of first electrodes are divided into at least two groups according to a position in the second direction, and
wherein the first electrodes of an odd group from among the at least two groups are connected to channel wires in the first channel wiring area, and the first electrodes of an even group from among the at least two groups are connected to channel wires in the second channel wiring area.

7. The touch screen panel of claim 1, wherein the plurality of first electrodes are divided into at least two groups according to a position in the second direction, and
wherein the first electrodes of different groups of the at least two groups are connected to different channel wires.

8. The touch screen panel of claim 1, wherein the plurality of first electrodes and the plurality of second electrodes are formed on a same surface of the substrate.

9. The touch screen panel of claim 1, wherein the channel wiring area is formed on a circuit substrate that is different from the substrate and is attachable to the substrate.

10. The touch screen panel of claim 1, wherein a touch is sensed by using capacitance variations of capacitors that are formed in the plurality of first electrodes and the plurality of second electrodes in the sensing area.

11. A touch sensing controller comprising:
a plurality of terminals configured to receive a plurality of sensing signals which are provided from a touch screen panel through a plurality of channels; and
a data mapping unit that is configured to generate touch data based on the plurality of sensing signals and determine a storage position of the touch data to store the touch data in a storage according to a position of an electrode among a plurality of electrodes arranged in a plurality of rows and columns in the touch screen panel.

12. The touch sensing controller of claim 11, wherein the touch screen channel further comprises a plurality of channel wires connected to the plurality of electrodes, and
wherein the storage has a plurality of storage positions arranged in a plurality of rows and columns to correspond to the plurality of electrodes,
wherein the data mapping unit determines the storage position so that the position of the electrode in the touch screen panel corresponds to the storage position in the storage by compensating for position mismatch between the position of the electrode and an original storage position in the storage where the touch data is to be stored if all electrodes in a same column of the touch screen panel are connected to a same channel wire among the plurality of channel wires.

13. The touch sensing controller of claim 12, wherein the data mapping unit comprises:
a touch data generator that amplifies the plurality of sensing signals and converts amplified sensing signals into digital signals to generate the touch data; and
an address decoder that generates addresses in which the touch data is stored, based on a touch driving timing signal and channel wiring connection information.

14. The touch sensing controller of claim 12, wherein the data mapping unit comprises:
a touch data generator comprising a plurality of input terminals and a plurality of touch data generating units configured to generate the touch data based on the plurality of sensing signals that are received via the plurality of input terminals;
a switching unit that connects the plurality of terminals to the plurality of input terminals of the touch data generator, respectively, and compensates for the position mismatch by switching connections between the plurality of terminals and the plurality of input terminals in response to a switching control signal; and
a switching controller that is configured to generate the switching control signal based on a touch driving timing signal and channel wiring connection information.

15. The touch sensing controller of claim 11, wherein the data mapping unit determines the storage position in which the touch data is stored, based on a touch driving timing signal and channel wiring connection information, and
wherein the touch driving timing signal indicates the position of the electrode in a direction of a row in the touch screen panel.

16. The touch sensing controller of claim 11, further comprising a look-up table including information indicating a connection relation between the plurality of electrodes of the touch screen panel and the plurality of channels.

17. A touch screen panel comprising:
a plurality of electrodes, arranged in a plurality of rows and columns of a substrate, configured to sense touch on or above an electrode among the plurality of electrodes and generate a touch signal therefrom;
a plurality of channel wires arranged in at least one side of the substrate; and
a plurality of electrode wires connecting the plurality of electrodes to the plurality of channel wires,
wherein a sum of lengths of electrode wires connected to all electrodes in one column is substantially equal to a sum of lengths of electrode wires connected to all electrodes in any of the other columns among the plurality of columns.

18. The touch screen panel of claim 17, wherein at least two electrodes, from among the plurality of electrodes, that are disposed in a same column are connected to different channel wires.

19. The touch screen panel of claim 18, wherein the plurality of channel wires comprise channel wires disposed in a first wiring area on one side of the substrate and channel wires disposed in a second wiring area on another side of the substrate, and
wherein the at least two electrodes disposed in the same column are connected to channel wires disposed in the first and second wiring areas, respectively.

20. The touch screen panel of claim 19, wherein the at least two electrodes are disposed in two adjacent rows, and
wherein an electrode, which is disposed in the same column as the at least two electrodes and a row immediately above or below a row where one electrode of the at least two electrodes is disposed, is connected to a same channel wire to which another electrode of the at least two electrode is connected.

21. The touch screen panel of claim 17, wherein the plurality of channel wires comprise channel wires disposed in a first wiring area on one side of the substrate and channel wires disposed in a second wiring area on another side of the substrate, and
wherein a sum of lengths of electrode wires connected to the channel wires disposed in the first wiring area is substantially equal to a sum of lengths of electrode wires connected to the channel wires disposed in the second wiring area.

\* \* \* \* \*